United States Patent
Kim et al.

(10) Patent No.: US 11,265,942 B2
(45) Date of Patent: Mar. 1, 2022

(54) METHOD FOR SUPPORTING DUAL CONNECTIVITY IN WIRELESS LAN SYSTEM AND WIRELESS TERMINAL USING SAME

(71) Applicant: LG ELECTRONICS INC., Seoul (KR)

(72) Inventors: Suhwook Kim, Seoul (KR); Jeongki Kim, Seoul (KR); Kiseon Ryu, Seoul (KR); Taewon Song, Seoul (KR); Insun Jang, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/042,083

(22) PCT Filed: Mar. 25, 2019

(86) PCT No.: PCT/KR2019/003428
§ 371 (c)(1),
(2) Date: Sep. 25, 2020

(87) PCT Pub. No.: WO2019/190133
PCT Pub. Date: Oct. 3, 2019

(65) Prior Publication Data
US 2021/0100052 A1    Apr. 1, 2021

(30) Foreign Application Priority Data

Mar. 27, 2018  (KR) ........................ 10-2018-0035345
Mar. 28, 2018  (KR) ........................ 10-2018-0035822

(51) Int. Cl.
*H04W 4/00* (2018.01)
*H04W 76/15* (2018.01)
(Continued)

(52) U.S. Cl.
CPC ....... *H04W 76/15* (2018.02); *H04W 36/0069* (2018.08); *H04W 36/00837* (2018.08); *H04W 48/16* (2013.01); *H04W 84/12* (2013.01)

(58) Field of Classification Search
None
See application file for complete search history.

(56) References Cited

U.S. PATENT DOCUMENTS

2008/0056211 A1* 3/2008 Kim ................. H04L 29/12839
                                                            370/338
2016/0156392 A1* 6/2016 Jung ...................... H04W 8/24
                                                            370/338
(Continued)

FOREIGN PATENT DOCUMENTS

KR        100758354        9/2007
KR       20120018201        2/2012
(Continued)

OTHER PUBLICATIONS

PCT International Application No. PCT/KR2019/003428, International Search Report dated Jul. 2, 2019, 2 pages.

*Primary Examiner* — Suhail Khan
(74) *Attorney, Agent, or Firm* — Lee Hong Degerman Kang Waimey

(57) ABSTRACT

A method for supporting dual connectivity performed by a STA connected to a first AP and a second AP in a WLAN according to one embodiment includes: determining whether a predetermined AP change condition is satisfied while performing uplink transmission based on a first operating band for the first AP; transmitting an AP change request frame to the first AP in order to perform uplink transmission based on a second operating band for the second AP when it is determined that the AP change condition is satisfied; receiving an AP change response frame from the first AP in response to the AP change request frame;

(Continued)

performing a channel switch operation from the first operating band to the second operating band when the AP change request frame is received; and transmitting an uplink frame to the second AP based on the second operating band.

14 Claims, 21 Drawing Sheets

(51) Int. Cl.
*H04W 36/00* (2009.01)
*H04W 48/16* (2009.01)
*H04W 84/12* (2009.01)

(56) References Cited

U.S. PATENT DOCUMENTS

| | | | |
|---|---|---|---|
| 2016/0183172 A1* | 6/2016 | Lee | H04W 48/06 370/329 |
| 2017/0181204 A1 | 6/2017 | Grandhi | |
| 2018/0288698 A1* | 10/2018 | Ginsburg | H04W 52/0216 |

FOREIGN PATENT DOCUMENTS

| KR | 20150009118 | 1/2015 |
|---|---|---|
| KR | 20160065769 | 6/2016 |

\* cited by examiner (A)

(B)

METHOD FOR SUPPORTING DUAL CONNECTIVITY IN WIRELESS LAN SYSTEM AND WIRELESS TERMINAL USING SAME

CROSS-REFERENCE TO RELATED APPLICATIONS

This application is the National Stage filing under 35 U.S.C. 371 of International Application No. PCT/KR2019/003428, filed on Mar. 25, 2019, which claims the benefit of earlier filing date and right of priority to Korean Application Nos. 10-2018-0035345, filed on Mar. 27, 2018, and 10-2018-0035822, filed on Mar. 28, 2018, the contents of which are all hereby incorporated by reference herein in their entirety.

BACKGROUND

Technical Field

The present specification relates to wireless communication and, more particularly, to a method for supporting dual connectivity in a wireless local area network system and a wireless terminal using the same.

Related Art

In a next-generation WLAN, a dense environment having a great number of access points (APs) and stations (STAs) is primarily considered. Discussions have been conducted on improvement in spectrum efficiency and area throughput in this dense environment. The next-generation WLAN pays attention to actual performance improvement not only in an indoor environment but also in an outdoor environment, which is not significantly considered in an existing WLAN.

Specifically, scenarios for a wireless office, a smart home, a stadium, a hotspot, a building/apartment, and the like receive attention in the next-generation WLAN. Discussions are ongoing about improvement in performance of a WLAN system in a dense environment including a large number of APs and STAs based on relevant scenarios.

In a conventional WLAN system, a STA can connect to only one AP. Thus, when communication with the AP is not smooth or is difficult, the STA needs to wait for a certain period of time or to perform connection to a different AP.

However, it also takes time for the STA to connect to the different AP, causing inconvenience to a user. When connection with the AP is not smooth, a technique for naturally connecting the STA to the different AP without causing any inconvenience to the user may be considered.

SUMMARY

An aspect of the present specification is to provide a method for supporting dual connectivity performed by a STA connected to a first AP and a second AP with improved performance in a wireless local area network (WLAN) system and a wireless terminal using the same.

A method for supporting dual connectivity performed by a STA connected to a first AP and a second AP in a WLAN according to one embodiment includes: determining whether a predetermined AP change condition is satisfied while performing uplink transmission based on a first operating band for the first AP; transmitting an AP change request frame to the first AP in order to perform uplink transmission based on a second operating band for the second AP when it is determined that the AP change condition is satisfied; receiving an AP change response frame from the first AP in response to the AP change request frame; performing a channel switch operation from the first operating band to the second operating band when the AP change request frame is received; and transmitting an uplink frame to the second AP based on the second operating band.

According to one embodiment of the present specification, there are provided a method for supporting dual connectivity performed by a STA connected to a first AP and a second AP with improved performance in a wireless local area network (WLAN) system and a wireless terminal using the same.

DESCRIPTION OF EXEMPLARY EMBODIMENTS

The above-described features and the following detailed description are exemplary contents for helping a description and understanding of the present specification. That is, the present specification is not limited to this embodiment and may be embodied in other forms. The following embodiments are merely examples to fully disclose the present specification, and are descriptions to transfer the present specification to those skilled in the art. Therefore, when there are several methods for implementing components of the present specification, it is necessary to clarify that the present specification may be implemented with a specific one of these methods or equivalent thereof.

In the present specification, when there is a description in which a configuration includes specific elements, or when there is a description in which a process includes specific steps, it means that other elements or other steps may be further included. That is, the terms used in the present specification are only for describing specific embodiments and are not intended to limit the concept of the present specification. Furthermore, the examples described to aid the understanding of the present specification also include complementary embodiments thereof.

The terms used in the present specification have the meaning commonly understood by one of ordinary skill in the art to which the present specification belongs. Terms commonly used should be interpreted in a consistent sense in the context of the present specification. Further, terms used in the present specification should not be interpreted in an idealistic or formal sense unless the meaning is clearly defined. Hereinafter, embodiments of the present specification will be described with reference to the accompanying drawings.

Figure 1:
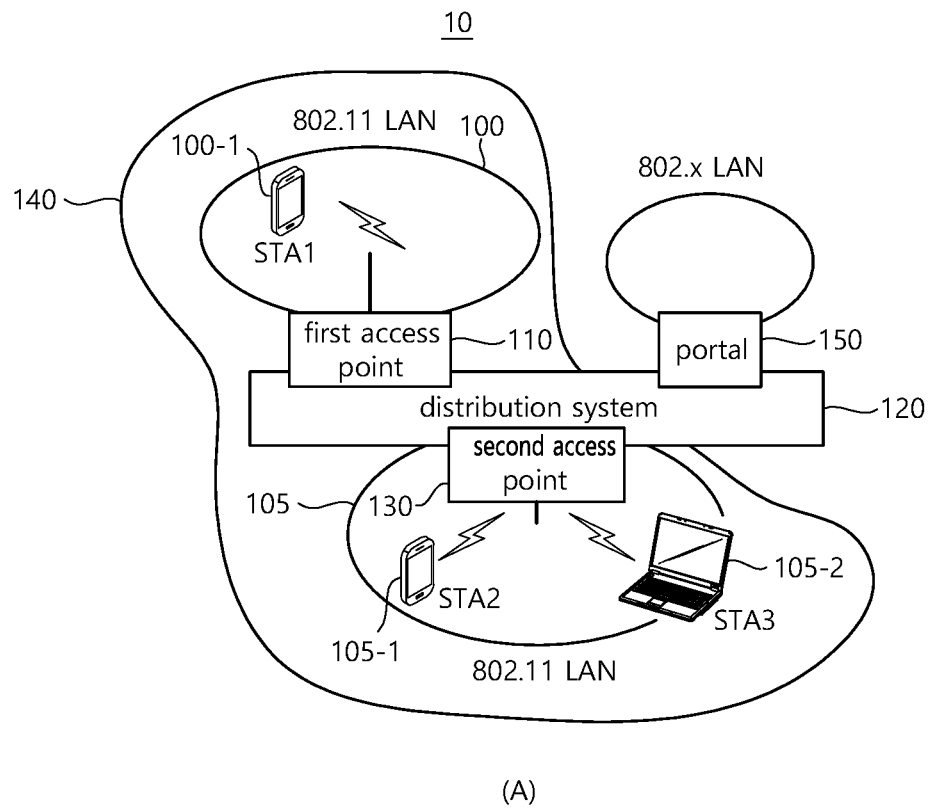
FIG. 1 is a conceptual diagram illustrating the structure of a WLAN system.
Figure 1:
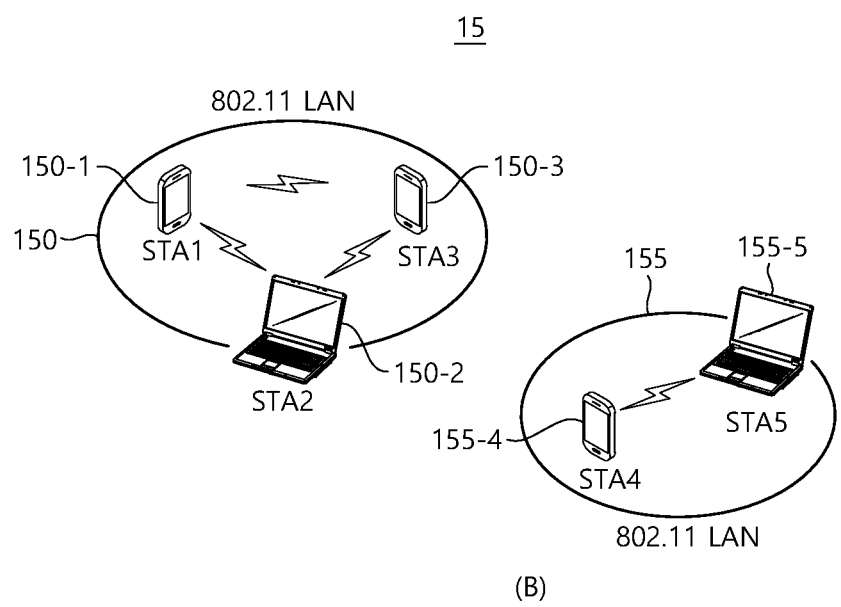

FIG. 1 is a conceptual diagram illustrating the structure of a WLAN system. FIG. 1(A) illustrates a structure of an infrastructure network of institute of electrical and electronic engineers (IEEE) 802.11.

Referring to FIG. 1(A), a WLAN system 10 of FIG. 1(A) may include at least one basic service set (hereinafter, referred to as 'BSS') 100 and 105. The BSS is a set of access points (hereinafter, APs) and stations (hereinafter, STAs) that can successfully synchronize and communicate with each other and is not a concept indicating a specific area.

For example, a first BSS 100 may include a first AP 110 and one first STA 100-1. A second BSS 105 may include a second AP 130 and one or more STAs 105-1 and 105-2.

The infrastructure BSSs 100 and 105 may include at least one STA, APs 110 and 130 for providing a distribution service, and a distribution system (DS) 120 for connecting a plurality of APs.

The DS 120 may connect a plurality of BSSs 100 and 105 to implement an extended service set (hereinafter, 'ESS') 140. The ESS 140 may be used as a term indicating one network to which at least one AP 110 and 130 is connected through the DS 120. At least one AP included in one ESS 140 may have the same service set identification (hereinafter, SSID).

A portal 150 may serve as a bridge for connecting a WLAN network (IEEE 802.11) with another network (e.g., 802.X).

In a WLAN having a structure as illustrated in FIG. 1(A), a network between the APs 110 and 130 and a network between APs 110 and 130 and STAs 100-1, 105-1, and 105-2 may be implemented.

FIG. 1(B) is a conceptual diagram illustrating an independent BSS. Referring to FIG. 1(B), a WLAN system 15 of FIG. 1(B) may perform communication by setting a network between STAs without the APs 110 and 130, unlike FIG. 1(A). A network that performs communication by setting a network even between STAs without the APs 110 and 130 is defined to an ad-hoc network or an independent basic service set (hereinafter, 'BSS').

Referring to FIG. 1(B), an IBSS 15 is a BSS operating in an ad-hoc mode. Because the IBSS does not include an AP, there is no centralized management entity. Therefore, in the IBSS 15, STAs 150-1, 150-2, 150-3, 155-4, and 155-5 are managed in a distributed manner.

All STAs 150-1, 150-2, 150-3, 155-4, and 155-5 of the IBSS may be configured with mobile STAs, and access to a distributed system is not allowed. All STAs of the IBSS form a self-contained network.

The STA described in the present specification is a random function medium including a medium access control (hereinafter, MAC) following a standard of the Institute of Electrical and Electronics Engineers (IEEE) 802.11 standard and a physical layer interface for a wireless medium and may broadly be used as a meaning including both an AP and a non-AP station (STA).

The STA described in the present specification may also be referred to as various names such as a mobile terminal, a wireless device, a wireless transmit/receive unit (WTRU), a user equipment (UE), a mobile station (MS), a mobile subscriber unit, or simply a user.

Figure 2:
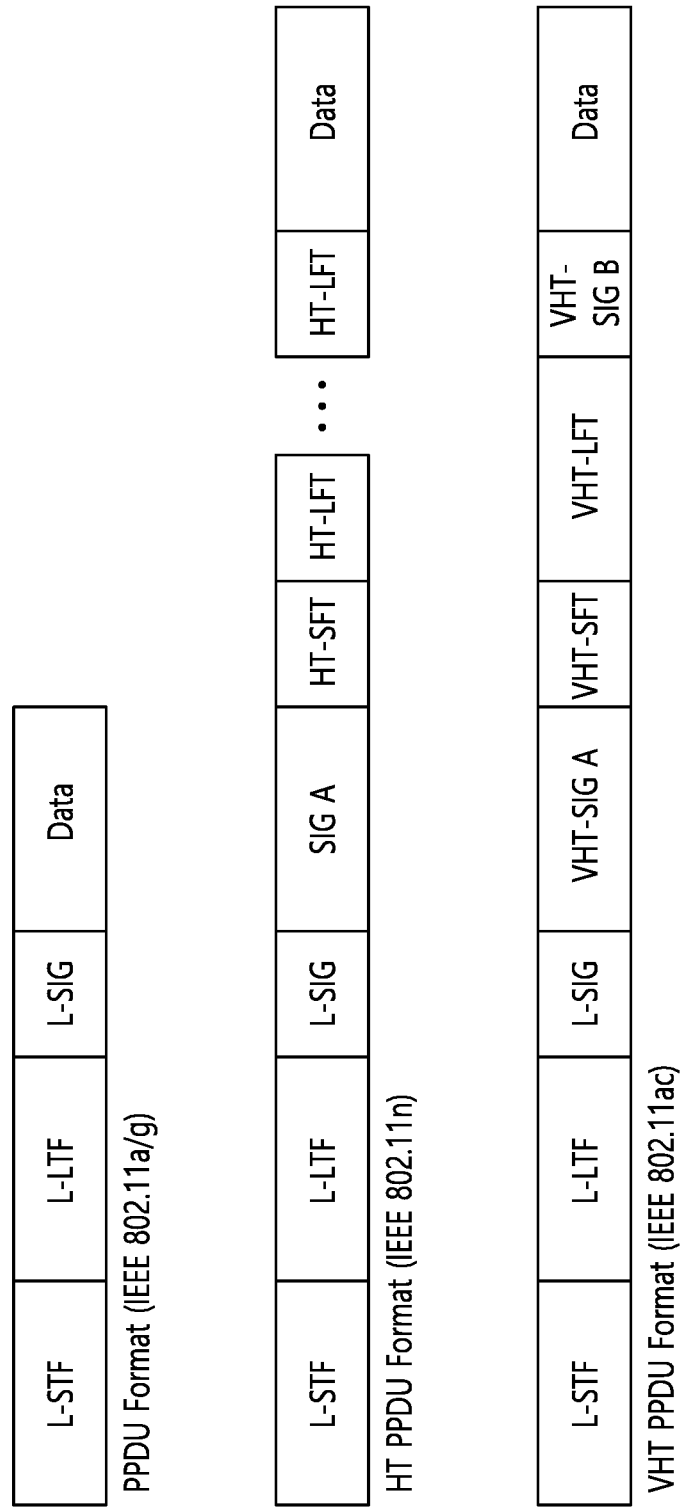
FIG. 2 illustrates an example of a PPDU used in an IEEE standard.

FIG. 2 illustrates an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
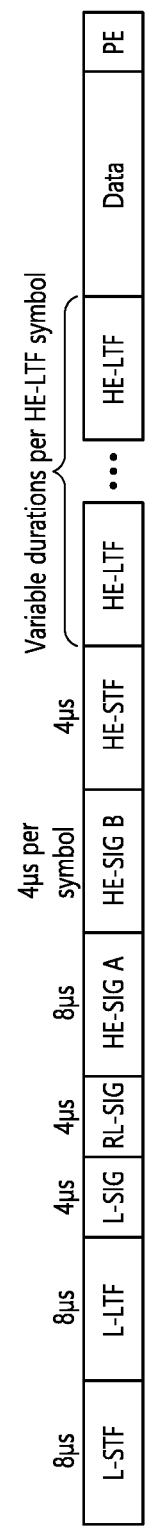
FIG. 3 illustrates an example of an HE PDDU.

FIG. 3 illustrates an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

The PPDU used in the IEEE standard is mainly described as a PPDU structure transmitted with a channel bandwidth of 20 MHz. The PPDU structure transmitted with a bandwidth (e.g., 40 MHz and 80 MHz) wider than the channel bandwidth of 20 MHz may be a structure in which linear scaling is applied to the PPDU structure used in the channel bandwidth of 20 MHz.

The PPDU structure used in the IEEE standard may be generated based on 64 Fast Fourier Transforms (FTFs), and a cyclic prefix portion (CP portion) may be ¼. In this case, a length of an effective symbol interval (or FFT interval) may be 3.2 us, a CP length may be 0.8 us, and symbol duration may be 4 us (3.2 us+0.8 us) that adds the effective symbol interval and the CP length.

Figure 4:
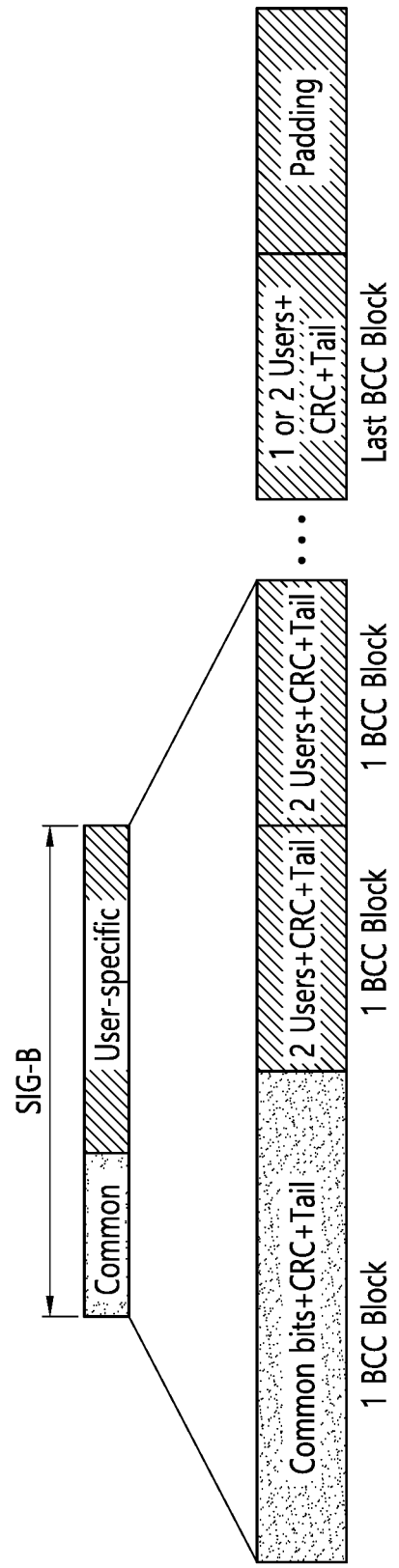
FIG. 4 illustrates an example of an HE-SIG-B field.

FIG. 4 is a block diagram illustrating an example of an HE-SIG-B field.

As illustrated, the HE-SIG-B field may include a common field at the beginning, and the common field can be encoded separately from a field following the common field. That is, as illustrated in FIG. 4 the HE-SIG-B field may include the common field including common control information and a user-specific field including user-specific control information. In this case, the common field may include a corresponding CRC field and may be coded as one BCC block. The subsequent user-specific field may include, as illustrated, user-specific fields for two users and CRC fields corresponding to the user-specific fields and may be coded as one BCC block.

Figure 5:
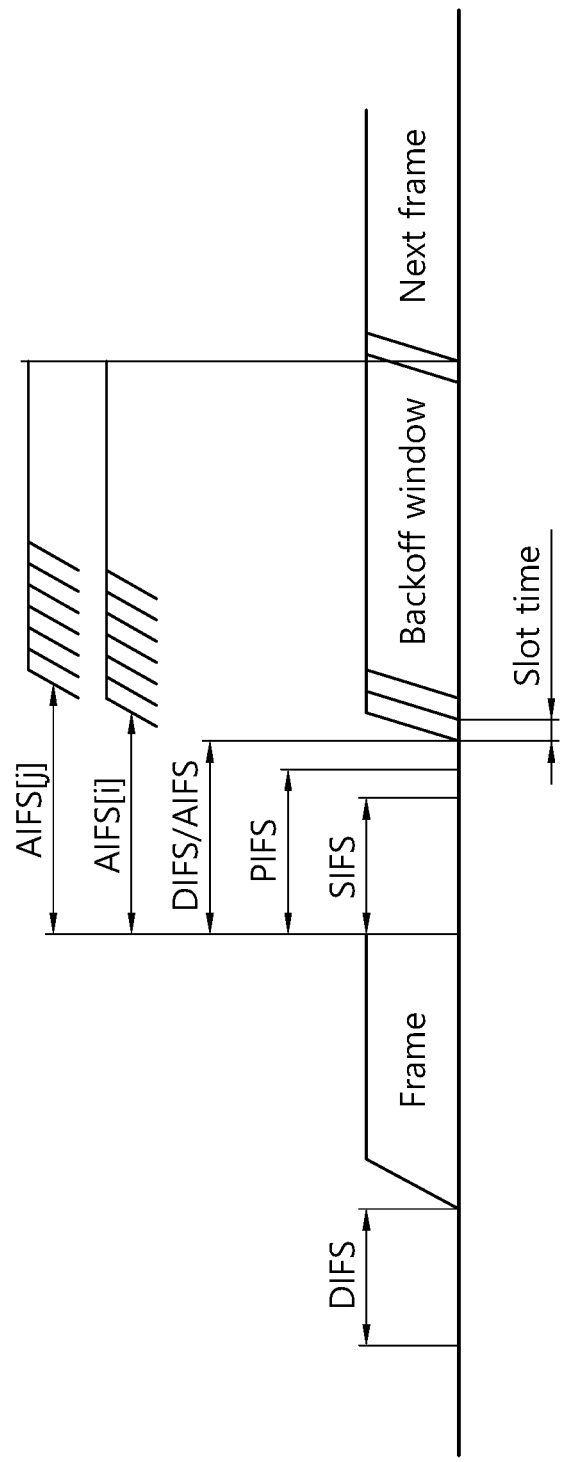
FIG. 5 is a conceptual diagram illustrating a backoff procedure of EDCA.

FIG. 5 is a conceptual diagram illustrating a backoff procedure of EDCA.

A plurality of STAs may share a wireless medium based on a distributed coordination function (hereinafter, "DCF"). The DCF is an access protocol for controlling a collision between STAs and may use a carrier sense multiple access/collision avoidance (hereinafter, "CSMA/CA").

According to a channel access scheme using the DCF, when the wireless medium is unoccupied (i.e., when a channel is idle) during a DCF interframe space (DIFS), a STA can transmit an internally determined MPDU.

When it is determined that the wireless medium is occupied by another STA (i.e., when the channel is busy) by a carrier sensing mechanism of the STA, the STA may determine the size of a contention window (hereinafter, "CW") and may perform a backoff procedure.

For reference, physical carrier sensing for determining whether a wireless medium is occupied by a different STA may be understood as a clear channel assessment (CCA) procedure.

When a frame to be transmitted by a wireless terminal occurs, a CCA procedure may be performed for a wireless channel for a preset period (e.g., DIFS) before the frame is transmitted. Further, the CCA procedure may be continuously performed by the wireless terminal until the wireless channel is determined to be idle.

For example, when the strength of a radio signal received during a preset period exceeds a preset threshold, the wireless terminal may determine that the wireless medium is busy.

In another example, when the strength of a radio signal received during a preset period does not exceed a preset threshold, the wireless terminal may determine that the wireless medium is idle.

In order to perform a backoff procedure, each STA may set a backoff value, which is arbitrarily selected within a contention window (CW), in a backoff counter. In this specification, time expressing the backoff value, which is selected by each STA, in slot time may be understood as the backoff window in FIG. 5.

Each STA may perform a backoff procedure for channel access by counting down the backoff window by slot time.

Among the plurality of STAs, a STA selecting a relatively shortest backoff window may obtain a transmission opportunity (hereinafter, "TXOP"), which is a right to occupy the wireless medium. During a time period for the TXOP, the remaining STAs may suspend countdown. The remaining STAs may wait until the time period for the TXOP expires.

After the time period for the TXOP expires, the remaining STAs may resume the suspended countdown in order to occupy the wireless medium.

According to this transmission method based on the DCF, it is possible to prevent a collision which may occur when a plurality of STAs transmits frames at the same time. However, the channel access scheme using the DCF does not have the concept of transmission priority level (i.e., user priority level). That is, using the DCF does not guarantee the quality of service (QoS) of traffic to be transmitted by the STA.

In order to resolve this problem, a hybrid coordination function (hereinafter, "HCF"), which is a new coordination function, is defined in 802.11e. The newly defined HCF has more enhanced performance than the channel access performance of the existing DCF.

To enhance QoS, the HCF may use two different types of channel access methods together, which are HCF-controlled channel access (HCCA) of a polling method and contention-based enhanced distributed channel access (EDCA).

A STA based on the HCF may transmit traffic data based on an arbitration interframe space (AIFS) corresponding to a user priority level instead of a DCF interframe space (DIFS) conventionally used.

Hereinafter, in embodiments of the disclosure, a terminal may be a device that is capable of supporting both a WLAN system and a cellular system. That is, the terminal may be construed as a UE supporting the cellular system or an STA supporting the WLAN system.

To facilitate the understanding of this specification, interframe spacing, which is mentioned in 802.11, is described. For example, interframe spacing (IFS) may correspond to a reduced interframe space (RIFS), a short interframe space (SIFS), a PCF interframe space (PIFS), a DCF interframe space (DIFS), an arbitration interframe space (AIFS), or an extended interframe space (EIFS).

Interframe spacing (IFS) may be determined depending on attributes specified by a physical layer of a STA regardless of the bit rate of the STA. Among the IFSs, IFSs other than the AIFS may be understood as a fixed value for each physical layer.

The SIFS has the shortest time gap among the IFSs mentioned above. Accordingly, the SIFS may be used when an STA occupying a wireless medium needs to maintain the occupation of the medium without any interruption by another STA during a period in which a frame exchange sequence is performed.

That is, by using the shortest gap between transmissions within a frame exchange sequence, the STA may be assigned priority to complete an ongoing frame exchange sequence. Also, the STA accessing the wireless medium by using the SIFS may immediately start transmission from the boundary of the SIFS without determining whether the medium is busy.

The duration of an SIFS for a specific physical (PHY) layer may be defined on the basis of a SIFSTime parameter. For example, the SIFS has a value of 16 μs in physical (PHY) layers according to IEEE 802.11a, IEEE 802.11g, IEEE 802.11n, and IEEE 802.11ac.

The PIFS may be used in order to provide an STA with the next highest priority level after the SIFS. That is, the PIFS may be used to obtain priority for accessing the wireless medium.

The DIFS may be used by an STA transmitting a data frame (MPDU) and a management frame (MAC protocol data unit (MPDU)) on the basis the DCF. After a received frame and backoff time expire, when it is determined that the medium is idle by a CS mechanism, the STA may transmit a frame.

Figure 6:
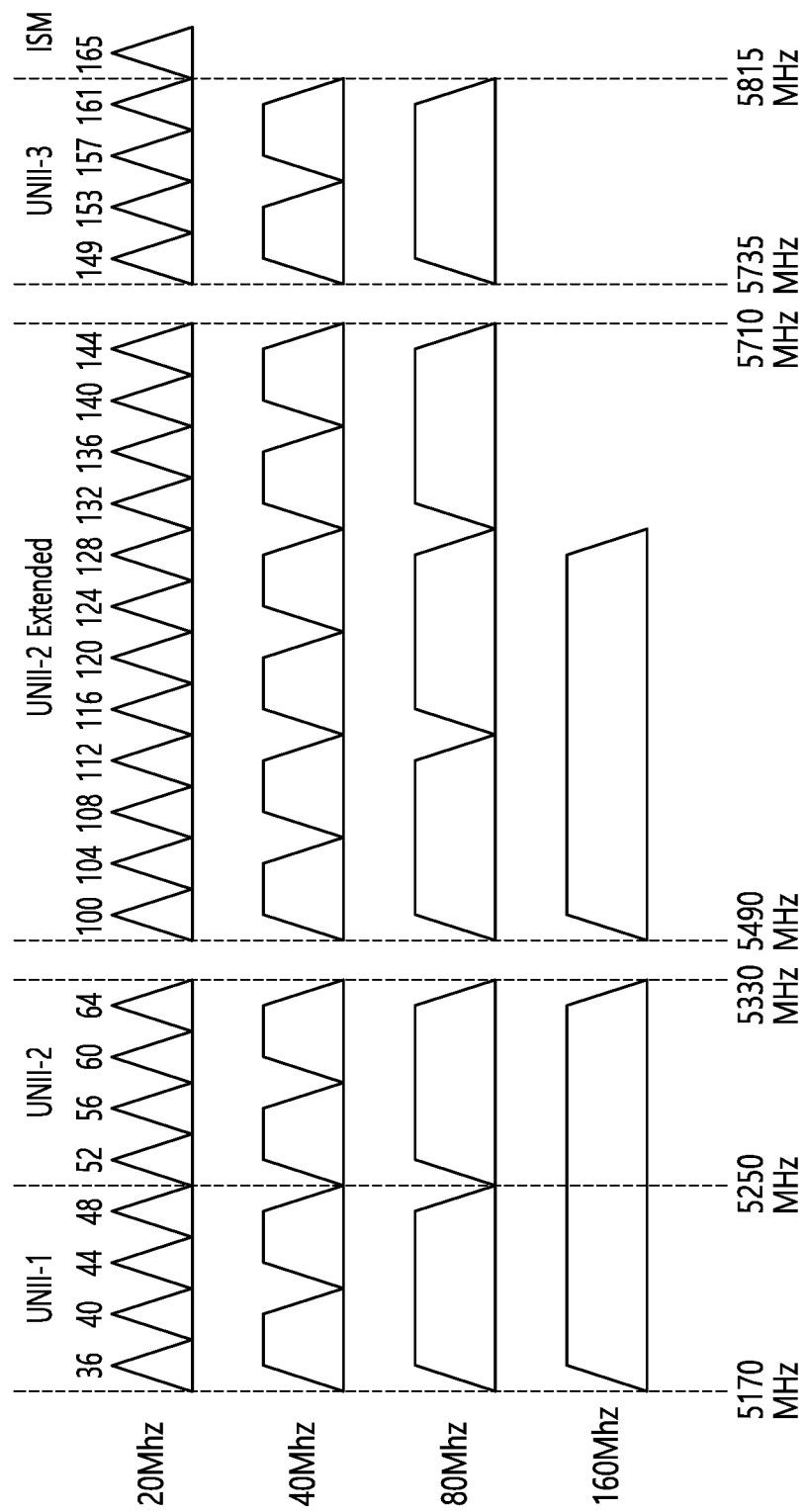
FIG. 6 illustrates channelization of a 5-GHz band in a WLAN system.

FIG. 6 illustrates channelization of a 5-GHz band in a WLAN system.

Referring to FIG. 6, in the wireless LAN system, a plurality of bands including a UNII-1 band, a UNII-2 band, a UNII-2 extended band, a UNII-3 band, and an industrial scientific, and medical (ISM) band may be used.

The UNII-1 band of FIG. 6 may be defined between 5170 MHz and 5250 MHz.

The UNII-1 band of FIG. 6 may include four 20-MHz channels (i.e., a 36th channel, a 40th channel, a 44th channel, and a 48th channel). For example, the 36th channel may be defined between 5170 MHz and 5190 MHz, and the 40th channel may be defined between 5190 MHz and 5210 MHz. Further, the 44th channel may be defined between 5210 MHz and 5230 MHz, and the 48th channel may be defined between 5230 MHz and 5250 MHz.

The UNII-1 band of FIG. 6 may include two 40-MHz channels. The UNII-1 band of FIG. 6 may include one 80-MHz channel.

The UNII-2 band of FIG. 6 may include four 20-MHz channels (i.e., a 52nd channel, a 56th channel, a 60th channel, and a 64th channel). For example, the 52nd channel may be defined between 5250 MHz and 5270 MHz, and the 56th channel may be defined between 5270 MHz and 5290 MHz. Further, the 60th channel may be defined between 5290 MHz and 5310 MHz, and the 64th channel may be defined between 5310 MHz and 5330 MHz.

The UNII-2 band of FIG. 6 may include two 40-MHz channels. The UNII-2 band of FIG. 6 may include one 80-MHz channel.

The UNII-2 extended band of FIG. 6 may include 12 20-MHz channels (i.e., a 100th channel, a 104th channel, a 108th channel, a 112th channel, a 116th channel, a 120th channel, a 124th channel, a 128th channel, a 132nd channel, a 136th channel, a 140th channel, and a 144th channel).

For example, the 100th channel may be defined between 5490 MHz and 5510 MHz, and the 104th channel may be defined between 5510 MHz and 5530 MHz. The 108th channel may be defined between 5530 MHz and 5550 MHz, and the 112th channel may be defined between 5550 MHz and 5570 MHz.

Further, the 116th channel may be defined between 5570 MHz and 5590 MHz, and the 120th channel may be defined between 5610 MHz and 5630 MHz. The 124th channel may be defined between 5610 MHz and 5630 MHz, and the 128th channel may be defined between 5630 MHz and 5650 MHz.

In addition, the 132th channel may be defined between 5650 MHz and 5670 MHz, and the 136th channel may be defined between 5670 MHz and 5690 MHz. The 140th channel may be defined between 5690 MHz and 5710 MHz, and the 144th channel may be defined between 5710 MHz and 5730 MHz.

The UNII-2 extended band of FIG. 6 may include six 40-MHz channels. The UNII-2 extended band of FIG. 6 may include three 80-MHz channels.

The UNII-3 band of FIG. 6 may include four 20-MHz channels (i.e., a 149th channel, a 153rd channel, a 157th channel, and a 161th channel). For example, the 149th channel may be defined between 5735 MHz and 5755 MHz, and the 153rd channel may be defined between 5755 MHz and 5775 MHz. The 157th channel may be defined between 5775 MHz and 5795 MHz, and the 161th channel may be defined between 5795 MHz and 5815 MHz.

The UNII-3 band of FIG. 6 may include two 40-MHz channels. The UNII-3 band of FIG. 6 may include one 80-MHz channel.

The ISM band of FIG. 6 may include one 20-MHz channel (i.e., a 165th channel). For example, the 165th channel may be defined in 5815 MHz and 5835 MHz.

Although FIG. 6 shows channelization of a 5-GHz band, it will be understood that the present specification is not limited thereto.

Figure 7:
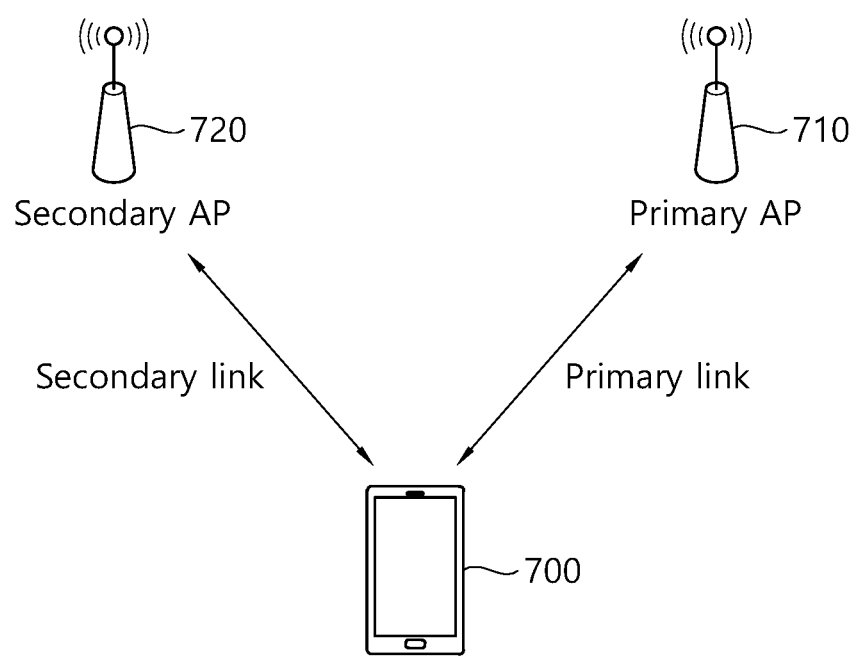
FIG. 7 is a conceptual diagram of a wireless terminal supporting dual connectivity according to one embodiment.

FIG. 7 is a conceptual diagram of a wireless terminal supporting dual connectivity according to one embodiment.

Referring to FIG. 1 to FIG. 7, the wireless terminal (i.e., STA, 700) according to the embodiment may be connected to two APs 710 and 720. In this specification, the wireless terminal (i.e., STA, 700) connected to the two APs may be understood as a terminal supporting dual connectivity.

For example, dual connectivity technology may be divided into 1-RF dual connectivity technology and 2-RF dual connectivity technology according to the number of radio frontend (RF) modules configured in a wireless terminal.

For example, a terminal having one RF module can perform transmission/reception in only one broadband channel. A terminal having two RF modules can perform transmission/reception in two broadband channels at the same time.

However, even though there are two RF modules, since a wireless terminal has one MAC layer, it is impossible to simultaneously perform a transmission operation in one RF module and a reception operation in another RF module.

When the 1-RF dual connectivity technology mentioned in this specification is applied, the following characteristics may be exhibited.

For example, even though two APs operate in the same channel band, when different primary channels are configured for the respective APs, a transmission operation may be selectively performed depending on whether each primary channel is busy/idle. That is, even though a primary channel of one AP is busy, a transmission operation may be performed based on an idle primary channel of a different AP.

For example, when two APs connected with a wireless terminal use different channels, the wireless terminal may switch to an AP having better performance depending on the situation. In particular, when operating channels (i.e., primary 20-MHz channels) of the respective APs have different channel bands, a transmission speed and a transmission distance may be selected in order to have optimal performance according to the situation. For example, the wireless terminal may communicate with an AP in a 5-GHz band or 60-GHz band in an environment in which the strength of a radio signal is high, and may switch to an AP in a 2.4-GHz band to perform wireless communication in an environment in which signal strength is weak.

In another example, when two APs use the same channel including a primary channel, a performance gain may not be considerable in an environment in which a wireless terminal is stationary. However, when a slight movement occurs in the wireless terminal, the wireless terminal may switch to an AP having a higher signal strength to perform wireless communication.

Further, in the 1-RF dual connectivity technology, when two APs use different bands/different channels, there is overhead for a channel shift. However, in general, overhead for a channel shift is overwhelmingly less than overhead for performing new connection with an AP.

When the 2-RF dual connectivity technology mentioned in this specification is applied, the following characteristics may be exhibited.

For example, even though two APs use different bands/different channels, a wireless terminal may identify the states of the channels at the same time using two RF modules included in the wireless terminal without any channel shift.

For example, when two APs use the same channel, a wireless terminal may use two RF modules for broadband (160 MHz in a 5-GHz band or multi-channel in a 60-GHz band) transmission/reception as those conventionally used, or may use one RF module when scanning an AP in a different band. However, when the two APs use different bands/different channels and each RF module included in the wireless terminal is allocated to each AP, it may be impossible for the wireless terminal to perform broadband transmission/reception.

A primary AP 710 of FIG. 7 may be understood as an AP in which a main operation of the wireless terminal (i.e., STA 700) is performed. For example, a security/authentication process may be performed before a process for connection between the wireless terminal (i.e., STA 700) and the primary AP 710.

For example, the wireless terminal (i.e., STA, 700) may continue to perform transmission/reception with the primary AP 710 (unless there is separate signaling). In this specification, a radio link between the wireless terminal (i.e., STA, 700) and the primary AP 710 may be referred to as a primary link.

A secondary AP 720 of FIG. 7 may be understood as an AP in which an additional operation of the wireless terminal (i.e., STA 700) is performed. For example, a process for connection between the wireless terminal (i.e., STA 700) and the secondary AP 720 may be partly (or entirely) omitted.

Additional signaling may be required for transmission/reception with the secondary AP 720. In this specification, a radio link between the wireless terminal (i.e., STA 700) and the secondary AP 720 may be referred to as a secondary link.

For example, the primary AP 710 and the secondary AP 720 of FIG. 7 may be physically at the same position. In this specification, there may be no restriction on whether a link exists between the primary AP 710 and the secondary AP 720

Hereinafter, in this specification, a method of transmitting a data frame between a wireless terminal and an AP may vary depending on the number of RF modules included in the wireless terminal, a channel distribution of a primary AP, and a channel distribution of a secondary AP.

In this specification, a method for a wireless terminal to discover an AP in a WLAN system includes a passive scanning method and an active scanning method.

For example, when passive scanning is used, the AP may periodically transmit information related to dual connectivity via a beacon frame. In another example, when active scanning is used, the AP may transmit information related to dual connectivity via a probe response frame.

In this specification, information related to dual connectivity transmitted by an AP may include information related to whether to support dual connectivity, information related to a list of APs capable of a secondary AP function when operating as a primary AP, information related to a list of APs capable of a primary AP function when operating as a secondary AP, information related to the number of terminals using the AP as a primary/secondary AP and/or traffic load, and information related to linked secure association support.

The information related to whether to support dual connectivity may be associated with whether the AP supports a dual connectivity function. For the AP according to this embodiment to support the dual connectivity function, the AP needs to have a function of filtering a frame to be transmitted to a wireless terminal according to a specific condition with information related to a different neighboring AP obtained.

The information related to the list of APs capable of the secondary AP function when operating as the primary AP may be associated with APs capable of operating as secondary APs along with the AP based on the dual connectivity function among neighboring APs and may be included in a beacon frame transmitted by an AP operating as a primary AP.

Specifically, the APs included in the list may receive or transmit information related to authentication from the AP transmitting the beacon frame. Alternatively, the APs included in the list may filter and exchange frames with each other according to a specific condition. Furthermore, the APs included in the list may include information related to a current traffic load level, the number of terminals, and whether linked secure association is supported.

The information related to the list of APs capable of the primary AP function when operating as the secondary AP may be associated with APs capable of operating as primary APs along with the AP based on the dual connectivity function among neighboring APs and may be included in a beacon frame transmitted by an AP operating as a secondary AP.

Specifically, the APs included in the list may receive or transmit information related to authentication from the AP transmitting the beacon frame. Alternatively, the APs included in the list may filter and exchange frames with each other according to a specific condition.

The information related to the number of terminals using the AP as the primary/secondary AP and/or the traffic load may be associated with the numbers of terminals using each AP as a primary AP and a secondary AP and traffic load of each AP.

The information related to linked secure association support may be associated with whether to support a function of allowing partly or entirely omitting a process for connection with a secondary AP after connection with a primary AP is completed in order to quickly establish the connections with the two APs. When the AP indicates whether to support this function, a wireless terminal (i.e., STA) may quickly complete a process for the connections with the APs based on this function.

In this specification, information related to dual connectivity transmitted by a wireless terminal (i.e., STA) may include information related to a primary/secondary AP currently being used, RF information, and information related to the type of an AP from which the wireless terminal wants a response.

The information related to the primary/secondary AP currently being used may be provided for an AP when the wireless terminal (i.e., STA) is using or is going to use a dual connectivity function and is connected to either a primary AP or a secondary AP.

The RF information may be understood as information indicating to the AP the number of RF modules of the terminal and a method for using RF modules of the terminal when there are two RF modules. For example, the RF information may be used to indicate whether one of the two RF modules is allocated to a primary AP and the other is allocated to a secondary AP or to indicate whether both RF modules are used for broadband transmission/reception of the primary AP and two RF modules are switched for use after separate signaling.

The information related to the type of the AP from which the wireless terminal wants the response may be information used to designate the type of an AP to transmit a probe response frame in response to a probe request frame. When the wireless terminal (i.e., STA) indicates a primary AP, only an AP operating as a primary AP can respond. When the wireless terminal is not indicate any designation, all APs can respond in response to a probe request frame transmitted by the wireless terminal (i.e., STA).

In this specification, an AP and a wireless terminal (i.e., STA) of a WLAN system may basically perform the following operations.

According to one embodiment, the AP may periodically transmit information related to dual connectivity via a beacon frame.

For example, while operating as a secondary AP, a specific AP may want to be connected with only a wireless terminal authenticated by a primary AP for enhanced security. In this case, rather than separately transmitting a probe response frame via a beacon frame or in a broadcast mode, the specific AP may obtain information related to the wireless terminal authenticated by the primary AP and may transmit a probe response frame to the wireless terminal (i.e., the wireless terminal authenticated by the primary AP) only when receiving a probe request frame from the wireless terminal (i.e., the wireless terminal authenticated by the primary AP).

In addition, the AP may transmit information related to dual connectivity to the STA via a probe response frame in response to a probe request frame received from the STA. For example, when the wireless terminal designates an AP type, only an AP operating as the AP type can transmit a probe response frame to the wireless terminal.

According to one embodiment, when there is no currently connected AP or there is no information related to a neighboring AP, the wireless terminal (i.e., STA) may transmit a probe request frame through a broadcast mode or may wait for a beacon frame to be received from the AP.

When the wireless terminal (i.e., STA) operates in connection with an AP with a dual connectivity function, if the wireless terminal (i.e., STA) has previously received information related to a neighboring AP from the AP, the wireless terminal (i.e., STA) may selectively transmit a probe request frame in a unicast mode.

The wireless terminal (i.e., STA) may receive information related to dual connectivity from neighboring APs, may select an AP after receiving, and may start an authentication and/or connection process. In this case, the wireless terminal may select an AP to operate as a primary AP and/or a secondary AP in advance, thereby terminating selection of both a primary AP and/or a secondary AP when the connection process including a dual connectivity negotiation process with the AP and/or the secondary AP is completed. Alternatively, after processes for connections with two respective APs are performed, a primary AP and/or a secondary AP may be selected through a dual connectivity negotiation process.

The wireless terminal (i.e., STA) may determine an AP operating as a primary AP and/or a secondary AP based on dual connectivity information received from APs.

In this specification, the dual connectivity negotiation process will be described with reference to FIG. 10.

Figure 8:
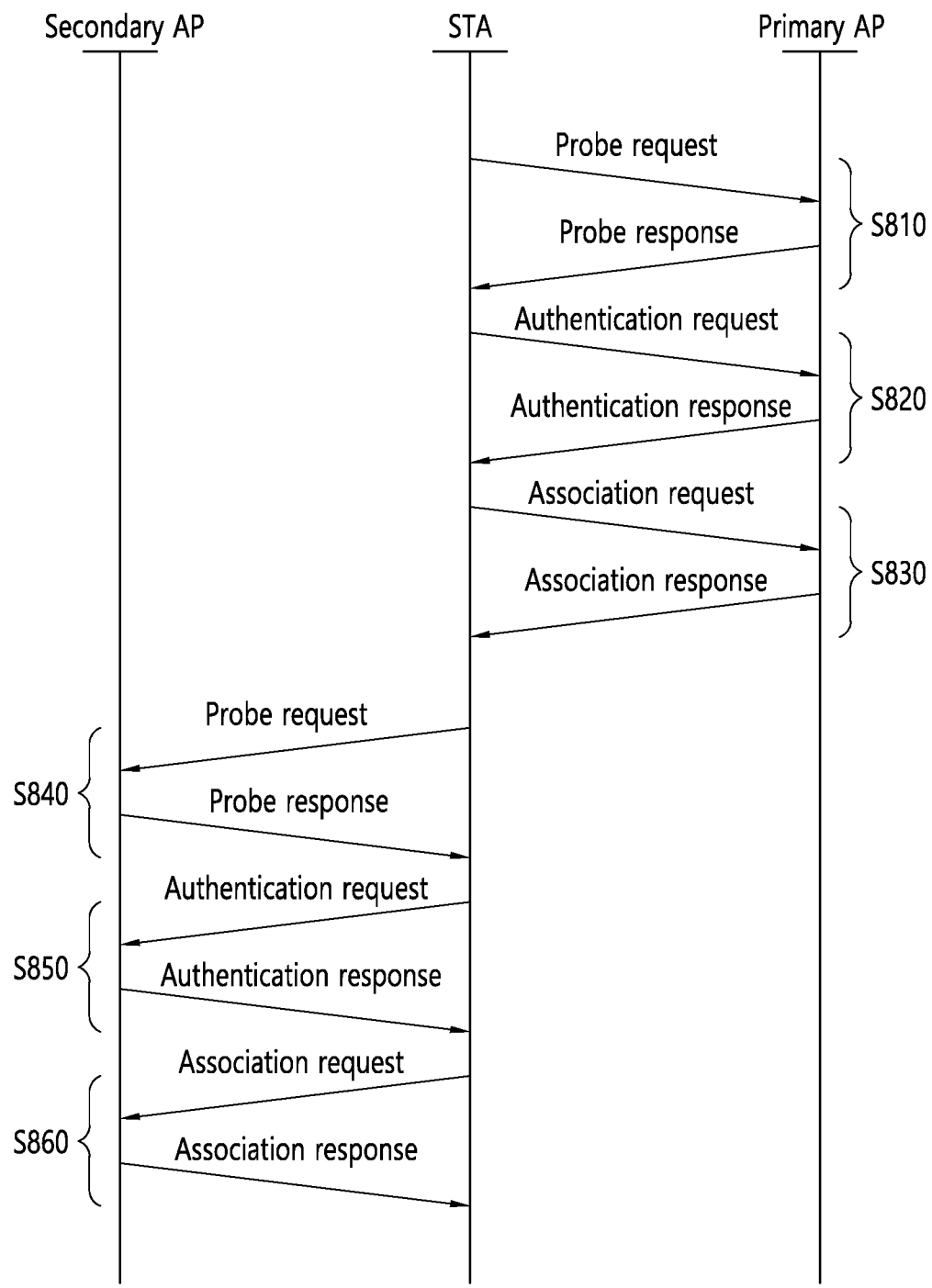
FIG. 8 illustrates a process in which a wireless terminal supporting dual connectivity performs level-1 connection with a plurality of APs according to one embodiment.

FIG. 8 illustrates a process in which a wireless terminal supporting dual connectivity performs level-1 connection with a plurality of APs according to one embodiment.

For example, when the wireless terminal (i.e., STA) of FIG. 8 fails to determine an AP operating as a primary AP and a different AP operating as a secondary AP, the wireless terminal (i.e., STA) of FIG. 8 may perform processes for connections to both APs first.

Referring to FIG. 1 to FIG. 8, the wireless terminal (i.e., the STA) may perform a process for connection with each of a primary AP and a secondary AP. For example, the wireless terminal (i.e., STA) of FIG. 8 may perform all of a scanning process S810, an authentication process S820, and an association process S830 with the primary AP.

Subsequently, the wireless terminal (i.e., STA) of FIG. 8 may perform all of a scanning process S840, an authentication process S850, and an association process S860 with the secondary AP.

When all of the processes S810 to S860 are performed, the wireless terminal (i.e., STA) of FIG. 8 may re-determine a primary AP and/or a secondary AP through a dual connectivity negotiation process (not shown).

In another example, a primary AP and a secondary AP may be determined in the processes S830 and S860 of FIG. 8. In this case, when processes for connections to both APs are completed, the primary AP and the secondary AP may be determined.

Figure 9:
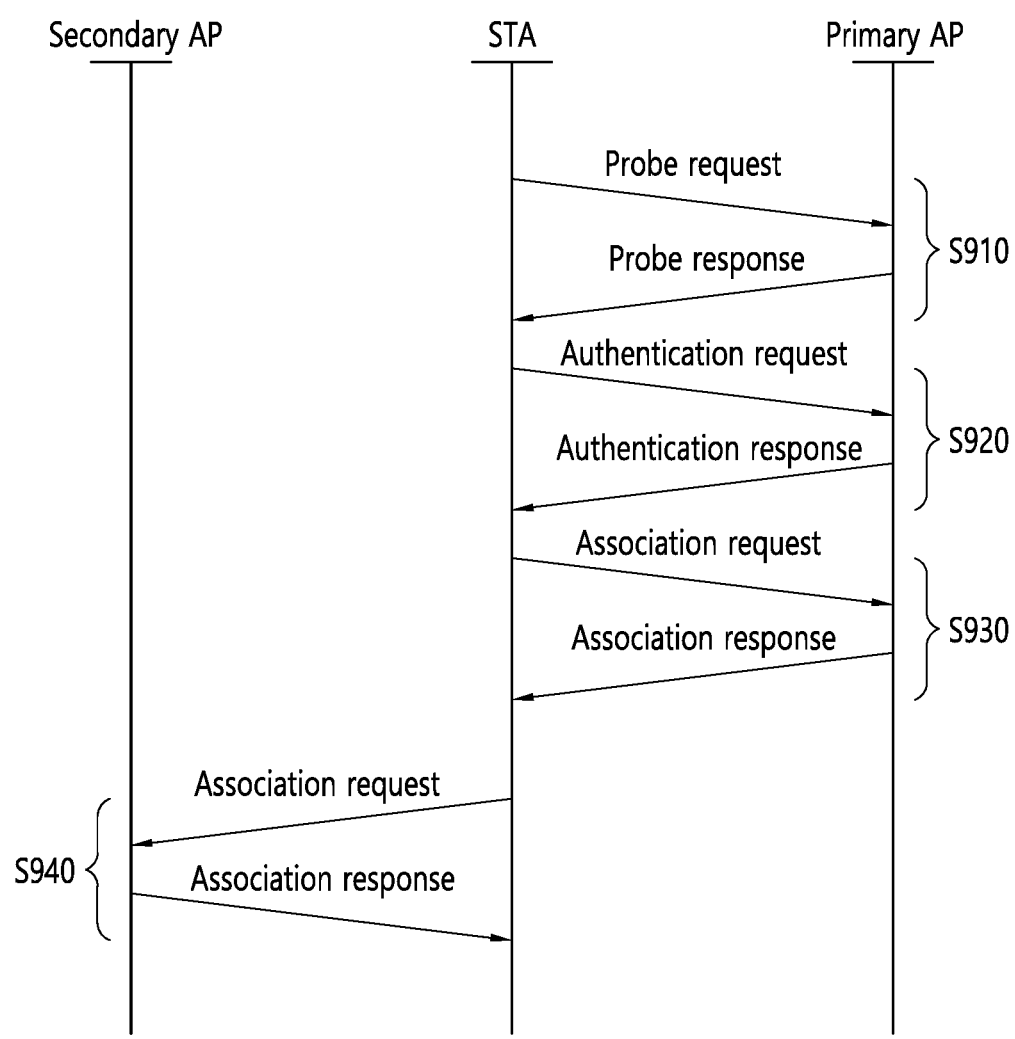
FIG. 9 illustrates a process in which a wireless terminal supporting dual connectivity performs level-2 connection with a plurality of APs according to one embodiment.

FIG. 9 illustrates a process in which a wireless terminal supporting dual connectivity performs level-2 connection with a plurality of APs according to one embodiment.

Referring to FIG. 1 to FIG. 9, the wireless terminal (i.e., STA) may perform all of a scanning process S910, an authentication process S920, and an association process S930 with a primary AP.

A secondary AP of FIG. 9 may receive security-related information related to the wireless terminal (i.e., STA) from the primary AP in advance. Accordingly, the wireless terminal (i.e., STA) may perform only an association process S940 with the secondary AP.

When the secondary AP receives an association request frame from the wireless terminal (i.e., STA), the secondary AP may ask the primary AP for authentication information related to the wireless terminal (i.e., STA) and may then transmit an association response frame to the wireless terminal (i.e., STA).

According to one embodiment, an AP to which the wireless terminal (i.e., an STA) is first connected may operate as the primary AP, and an AP subsequently connected with the wireless terminal (i.e., STA) may operate as the secondary AP.

After processes for connections with both APs are completed, a primary AP and a secondary AP may be redetermined through a dual connectivity negotiation process (not shown).

Alternatively, the dual connectivity negotiation process (not shown) may be omitted, and the primary AP and the secondary AP initially determined may be continuously used.

In an embodiment different from those illustrated in FIG. 8 and FIG. 9, the wireless terminal (i.e., STA) performs a level-3 connection process only with a primary AP and may be automatically connected to a secondary AP without a separate connection process.

In this case, the wireless terminal (i.e., STA) may determine the secondary AP during the connection process with the primary AP. Here, the primary AP may transmit information related to the wireless terminal (i.e., STA) to the selected secondary AP.

When the level-3 connection process is performed, similarly to the level-2 connection, a primary AP and/or a secondary AP may be redetermined through a dual connectivity negotiation process (not shown).

Alternatively, the dual connectivity negotiation process (not shown) may be omitted, and the primary AP and the secondary AP initially determined may be continuously used.

Figure 10:
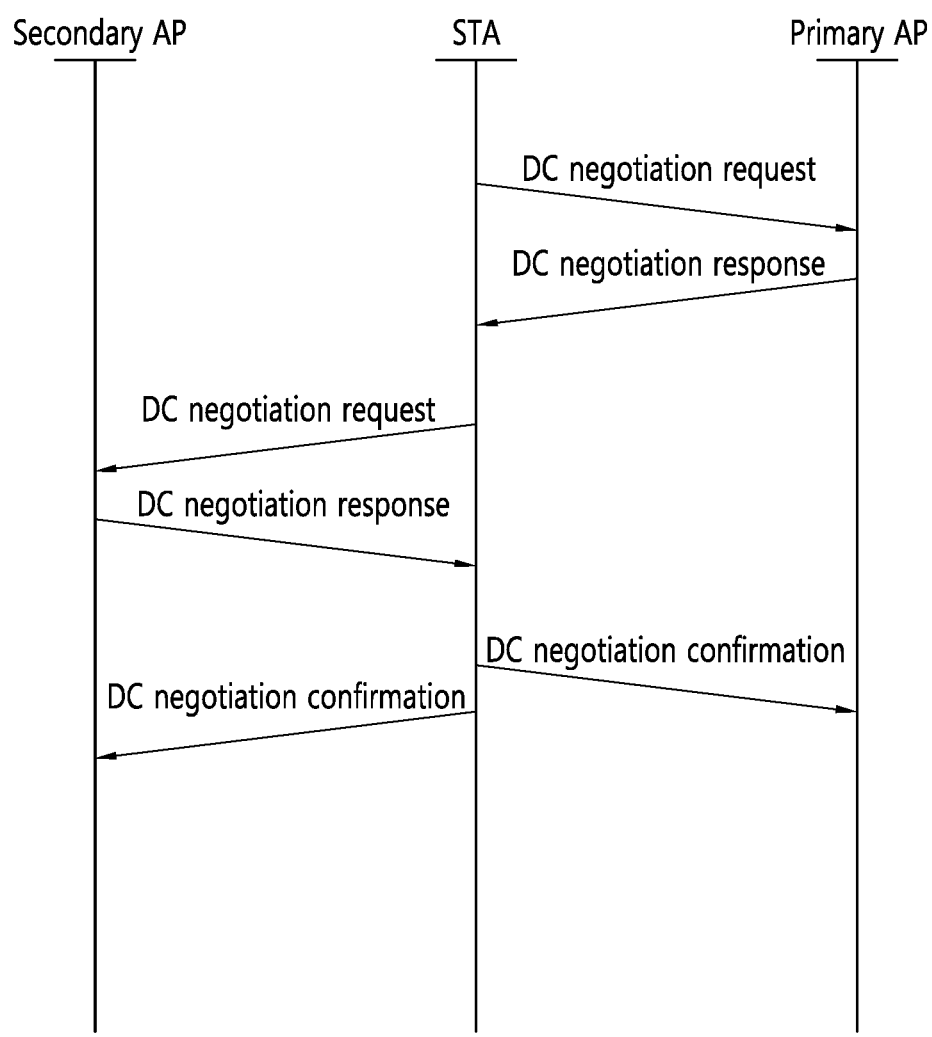
FIG. 10 illustrates a dual connectivity negotiation process according to one embodiment.

FIG. 10 illustrates a dual connectivity negotiation process according to one embodiment.

Referring to FIG. 1 to FIG. 10, a wireless terminal (i.e., STA) of FIG. 10 may transmit a dual connectivity negotiation request frame (hereinafter, "DC negotiation request frame") to each of a primary AP and a secondary AP.

For example, the DC negotiation request frame may be a frame for requesting information necessary to determine a primary AP and/or a secondary AP.

Upon receiving the DC negotiation request frame, each AP may transmit a DC negotiation response frame to the wireless terminal (i.e., STA). For example, the DC negotiation response frame may include all information necessary to determine a primary AP and/or a secondary AP.

The DC negotiation response frame may include information related to dual connectivity of the AP.

For example, the information related to the dual connectivity of the AP included in the DC negotiation response frame may be the same as information defined for the scanning process described above in FIG. 9 or an update on information provided in the scanning process before the connection process.

Furthermore, the DC negotiation response frame may further include preference information indicating preference of the AP for operating as each type.

For example, as the AP transmitting the DC negotiation response frame wants to operate as a primary AP, the preference information may be set to a number close to 10. In addition, as the AP transmitting the DC negotiation response frame wants to operate as a secondary AP, the preference information may be set to a number close to 1. Upon receiving the DC negotiation response frame including the preference information, the wireless terminal (i.e., STA) may determine a primary AP and/or a secondary AP based on the received preference information.

It will be appreciated that some operations may be omitted from the dual connectivity negotiation process of FIG. 10 or the dual connectivity negotiation process may be performed together with the association processes of FIG. 8 and FIG. 9.

In this specification, a primary AP and/or a secondary AP may be divided according to criteria illustrated below in Table 1. Some examples in Table 1 may be information determined by a STA and indicated to an AP. Further, some examples in Table 1 may be information determined by an AP and followed by a STA.

TABLE 1

|  | Criteria | Primary AP | Secondary AP |
| --- | --- | --- | --- |
| Case 1 | Direction | DL and UL | DL only |
| Case 2 | Access Category | VO(Voice), VI(Video), BE(Best effort), BK(Background) | VO, VI |
| Case 3 | Channel access method | EDCA, HCCA | HCCA |
| Case 4 | Frame length | Short length or Long length | Long length frame only |
| Case 5 | Transmission rate | Low rate or high rate | High rate frame only |
| Case 6 | QoS | Low or High quality traffic | High Quality traffic |
| Case 7 | Frame type | Data or Management frame | Data frame only |
| Case 8 | Frequency band | 2.4 GHz | 5 GHz |
| etc | No Criteria |  |  |

When the DC negotiation response frame is received from both the primary AP and the secondary AP of FIG. 10, the wireless terminal (i.e., STA) of FIG. 10 may determine an AP operating as a primary AP and/or a secondary AP.

Subsequently, information determined for the primary AP and/or the secondary AP may be included in a DC negotiation confirmation frame and may be transmitted to each of the primary AP and the secondary AP. Specifically, the DC negotiation request frame may include information related to dual connectivity of the wireless terminal (i.e., STA).

For example, the information related to the dual connectivity of the wireless terminal (i.e., STA) included in the DC negotiation request frame may be the same as information defined for the scanning process described above in FIG. 9. However, information related to the type of an AP from which the wireless terminal wants a response may be defined for asking the AP about preference for operating as the type.

For example, when the information is set to a value corresponding to a primary AP and is transmitted to AP1, AP1 may report preference for operating as a primary AP by responding with a specific value among preferences 1 to 10.

Referring to Table 1, a primary AP and a secondary AP may be divided according to the transmission direction of a frame. For example, the primary AP may be allowed to perform both downlink transmission and uplink transmission, and the secondary AP may be allowed to perform only downlink transmission or uplink transmission.

When the secondary AP performs only downlink transmission on a specific channel, overhead associated with channel contention for a wireless medium may be reduced. Further, considering that most traffic types are downlink, overall performance of a WLAN system may be improved.

When there are a too large number of wireless terminals in a WLAN system, a method for guaranteeing constant performance in a primary AP by concentrating wireless terminals that performs channel contention for uplink transmission into a secondary AP may be considered.

Referring to Table 1, a primary AP and a secondary AP may be divided according to the access category of a frame. For example, the primary AP may be allowed to perform a transmission operation for all frames of VO, VI, BE, and BK types, and the secondary AP may be allowed to perform a transmission operation only for frames of VO and VI types.

When the secondary AP transmits only a frame belonging to a specific AC associated with a high priority, overhead associated with channel contention in a WLAN system may be reduced. Further, since high-priority traffic is transferred to the secondary AP, traffic belonging to BE and BK ACs may be protected in the primary AP. In this case, overall performance of the WLAN system may be improved.

Referring to Table 1, a primary AP and a secondary AP may be divided according to a channel access method.

For example, the primary AP may transmit a frame using EDCA or HCCA, and the secondary AP may transmit a frame using HCCA. When an AP performs transmission only by a method of allocation in a secondary link, overhead due to channel contention hardly occurs, and thus QoS of specific traffic may be satisfied.

Referring to Table 1, a primary AP and a secondary AP may be divided according to a frame length.

For example, the primary AP may transmit a frame without any restriction on length, and the secondary AP may transmit only a frame having a specific length or longer. For example, when a frame having a short length is frequently transmitted, overhead of a WLAN system may be increased and performance may be reduced due to a collision in contention. Accordingly, when only a frame having a specific length or longer is transmitted by the secondary AP, the overhead of the WLAN system may be reduced and the performance may be improved.

Referring to Table 1, a primary AP and a secondary AP may be divided according to a transmission rate.

For example, the primary AP may transmit a frame without any restriction on transmission rate, and the secondary AP may transmit only a frame having a specific transmission rate or higher. For example, when a frame having a low transmission rate is frequently transmitted, overhead of a WLAN system may be increased. Accordingly, when only a frame having a specific transmission rate or higher is transmitted by the secondary AP, the overhead of the WLAN system may be reduced and performance may be improved.

Referring to Table 1, a primary AP and a secondary AP may be divided according to QoS.

For example, the primary AP may transmit traffic without any restriction on QoS, and the secondary AP may transmit only traffic having a specific QoS level or higher. For example, when the secondary AP transmits only traffic having a specific QoS level or higher, overhead due to channel contention in a WLAN system may be reduced and overall performance may be improved. Further, since high-priority traffic is transferred to the secondary AP, other traffic in the primary AP may be protected to some extent.

Referring to Table 1, a primary AP and a secondary AP may be divided according to a frame type.

For example, the primary AP may transmit a frame without any restriction on the type of a frame, and the secondary AP may transmit only a data frame. For example, when a management frame is frequently transmitted, overhead of a WLAN system may be increased. Accordingly, when the secondary AP transmits only a data frame, the overhead of the WLAN system may be reduced and overall performance may be improved.

Referring to Table 1, a primary AP and a secondary AP may be divided according to a BSS operating frequency band.

For example, the primary AP may guarantee a stable transmission distance in a 2.4-GHz band, and the secondary AP may provide higher throughput by performing wideband ultrahigh-speed transmission in a 5-GHz band.

The criteria for dividing a primary AP and a secondary AP illustrated in Table 1 are only examples, and it will be understood that a primary AP and a secondary AP may be divided by a different method other than the examples illustrated in Table 1.

Hereinafter, a communication operation between a wireless terminal and an AP for supporting 1-RF dual connectivity will be described.

Figure 11:
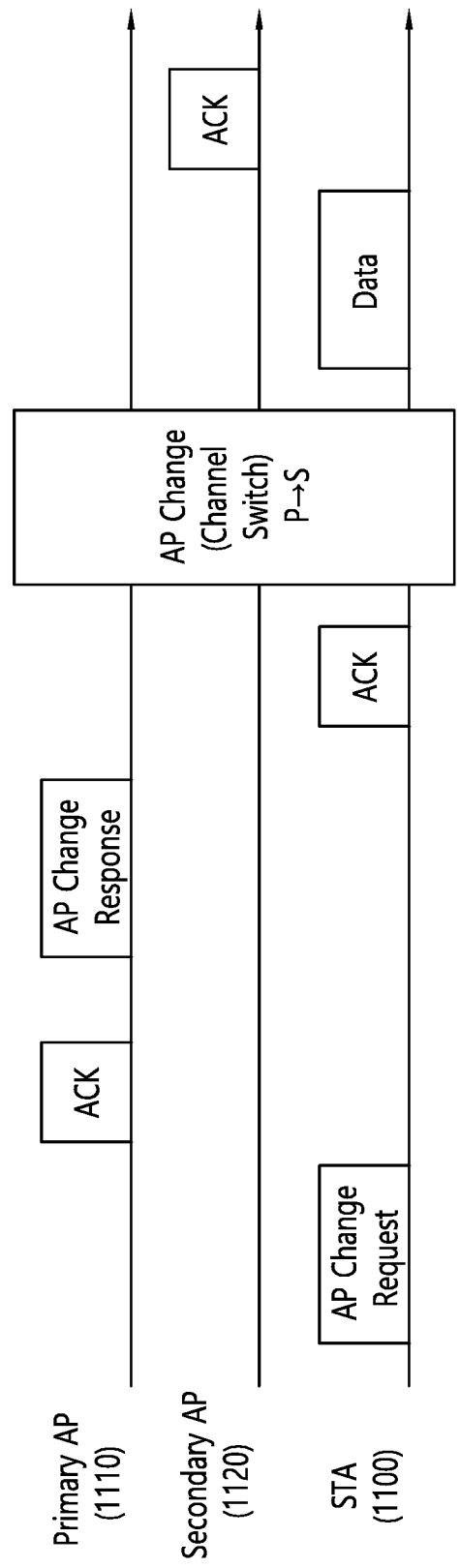
FIG. 11 illustrates an example of an AP change procedure for supporting dual connectivity in a WLAN system according to one embodiment.

FIG. 11 illustrates an example of an AP change procedure for supporting dual connectivity in a WLAN system according to one embodiment.

Referring to FIG. 1 to FIG. 11, a wireless terminal (STA) 1100 of FIG. 11 may correspond to the wireless terminal 700 of FIG. 7. A primary AP 1110 of FIG. 11 may correspond to the primary AP 710 of FIG. 7, and a secondary AP 1120 of FIG. 11 may correspond to the secondary AP 720 of FIG. 7.

For a clear and concise description of FIG. 11, it is assumed that an operating band for the primary AP 1110 and an operating band for the secondary AP 1120 are different, or channels are not contiguous even though the primary AP 1110 and the secondary AP 1120 have the same operating band.

Accordingly, a wireless terminal according to this embodiment needs to perform a channel switch procedure performed between an operating channel of the primary AP and an operating channel of the secondary AP.

For example, the operating band of the primary AP 1110 may be a 2.4-GHz band, and the operating band of the secondary AP 1120 may be a 5-GHz band. In another example, the operating band of the primary AP 1110 may be a 5-GHz UNII-1 band, and the operating band of the secondary AP 1120 may be a 5-GHz UNII-3 band.

That is, it will be understood that a channel switch operation is required when an AP for a main operation of the STA 1100 based on one RF module is changed from the primary AP 1110 to the secondary AP 1120 (or when the AP for the main operation of the STA 1100 is changed from the secondary AP 1120 to the primary AP 1110) in FIG. 11.

For uplink transmission in FIG. 11, the STA 1100 may perform an association process and a dual connectivity negotiation process with the two APs. In this process, the STA 1100 may determine a primary AP and a secondary AP among the two APs.

Subsequently, the STA 1100 may basically transmit and receive data to and from the primary AP 1110. For example, when a specific AP change condition is satisfied, the STA 1100 may intend to transmit uplink data in a transmission band of the secondary AP 1120 through an AP change process (i.e., a channel switch process).

That is, when the specific AP change condition is satisfied, the STA 1100 transmitting uplink data in a transmission band of the primary AP 1110 may intend to transmit uplink data in the transmission band of the secondary AP 1120.

For example, the AP change condition predetermined to change from the transmission band of the primary AP 1110 to the transmission band of the secondary AP 1120 may include the following examples.

A. Where a primary link is very busy and thus performance is not good

B. Where a frame having a specific type, a specific length, a specific transmission rate, and a specific QoS is designated to be transmitted to the secondary AP during the dual connectivity negotiation process C. Where the STA switches to the secondary AP having a longer transmission distance due to poor quality of the primary link D. Where throughput is expected to be higher on the secondary link than on the primary link Referring to FIG. 11, when the specific AP change condition is satisfied, the STA 1100 may transmit an AP change request frame to the primary AP 1110. The AP change request frame may be a frame for notifying the primary AP 1110 that the STA intends to move to the secondary AP 1120.

Subsequently, the primary AP 1110 may transmit an AP change response frame to the STA 1100 in response to the AP change request frame. In the example of FIG. 11, the primary AP 1110 may approve an AP change of the STA 1100.

Upon receiving the AP change response frame, the STA 1100 may move to the secondary AP 1120 and may transmit uplink data.

The AP change request frame of FIG. 11 may include the following information.

For example, the AP change request frame may include information related to time when an operating band for the STA is changed from the operating band of the primary AP 1110 to the operating band of the secondary AP 1120 according to the channel switch operation.

For example, the AP change request frame may include information related to a period in which the STA 1100 operates in the operating band of the secondary AP 1120. That is, when the period in which the STA operates in the operating band of the secondary AP 1120 expires, the STA 1100 may change back to the operating band of the primary AP 1110 in order to receive a downlink frame buffered by the primary AP 1110. However, when connection between the primary AP 1110 and the secondary AP 1120 is properly established, the primary AP 1110 can transmit the buffered downlink frame addressed to the STA 1100 to the secondary AP 1120, and thus this information may be omitted.

For example, the AP change request frame may include the operating channel (i.e., a primary 20-MHz channel) of the secondary AP 1120 and address information related to the secondary AP 1120. When the connection between the primary AP 1110 and the secondary AP 1120 is properly established, this information may be transmitted to the secondary AP through the primary AP.

The AP change response frame of FIG. 11 may include the following information.

For example, the AP change response frame may include information related to a result code and a reason for the AP change request frame. When the primary AP 1110 has remaining downlink data to be transmitted to the STA 1100 or there is a different reason, the AP change response frame may include information related to a reason along with rejection. When there is no other issue, the AP change response frame may include approval information.

For example, the AP change response frame may include information related to a buffered downlink frame. Specifically, when there is downlink data buffered by the primary AP 1110, the primary AP 1110 may notify the STA 1100 of the number of pieces of buffered downlink data and the size of the buffered downlink data through the AP change response frame. Accordingly, the STA 1100 may calculate time to change to the secondary AP 1120.

For example, the AP change response frame may include information related to time to change to the secondary AP 1120. When the primary AP 1110 changes AP change time transmitted by the STA 1100, information related to a changed value may be included in the AP change response frame.

For example, the AP change response frame may include information related to a period in which the STA 1100 operates in the operating band of the secondary AP 1120. When the primary AP 1110 changes a period in which the STA 1100 operates in the operating band of the secondary AP 1120 transmitted by the STA 1100, information on a changed value may be included in the AP change response frame.

Figure 12:
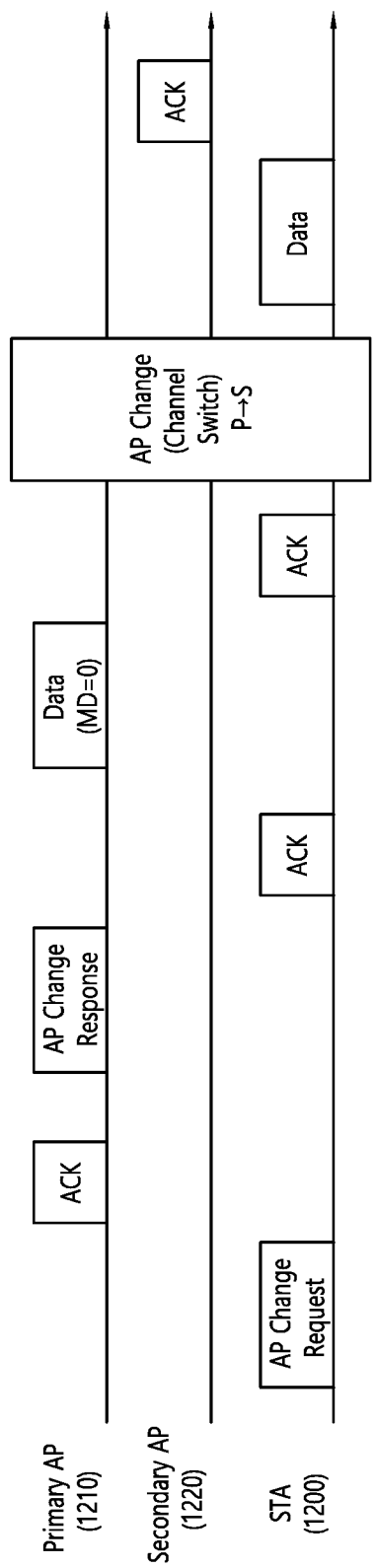
FIG. 12 illustrates another example of an AP change procedure for supporting dual connectivity in a WLAN system according to one embodiment.

FIG. 12 illustrates another example of an AP change procedure for supporting dual connectivity in a WLAN system according to one embodiment.

Referring to FIG. 1 to FIG. 12, a wireless terminal (STA) 1200 of FIG. 12 may correspond to the wireless terminal 1100 of FIG. 11. A primary AP 1210 of FIG. 12 may correspond to the primary AP 1110 of FIG. 11, and a secondary AP 1220 of FIG. 12 may correspond to the secondary AP 1120 of FIG. 11.

For a clear and concise description of FIG. 12, it is assumed that channels are not contiguous when an operating band for the primary AP 1210 and an operating band for the secondary AP 1220 are different or even though the primary AP 1210 and the secondary AP 1220 have the same operating band.

For example, the operating band of the primary AP 1210 may be a 2.4-GHz band, and the operating band of the secondary AP 1220 may be a 5-GHz band. In another example, the operating band of the primary AP 1210 may be a 5-GHz UNII-1 band, and the operating band of the secondary AP 1220 may be a 5-GHz UNII-3 band.

FIG. 12 may be understood as a process in a case where the primary AP 1210 has remaining buffered downlink data addressed to the STA 1200.

For example, the primary AP 1210 may transmit an AP change response frame to the STA 1200 in order to report that there is remaining buffered downlink data addressed to the STA 1200. Upon receiving the AP change response frame, the STA 1200 may wait without changing the AP until all of the remaining downlink data is received. Specifically, when the STA 1200 receives downlink data in which a more data (MD) field is set to 0 (which means that there is no more DL data to be received by the STA), the STA 1200 may perform an AP change procedure.

In the AP change procedure of FIG. 12, the same method may also be used in a switch from the secondary AP to the primary AP.

In this specification, it is recommended that a wireless terminal notifies a primary AP that the AP will be changed to the secondary AP and performs an AP change procedure. However, when a wireless medium of a primary link is very busy, when it is very difficult to transmit an AP change request frame due to a poor channel condition, or when it take a large amount of time to transmit an AP change request frame, the wireless terminal may perform an AP change procedure without transmitting an AP change request frame as illustrated below in FIG. 13.

Figure 13:
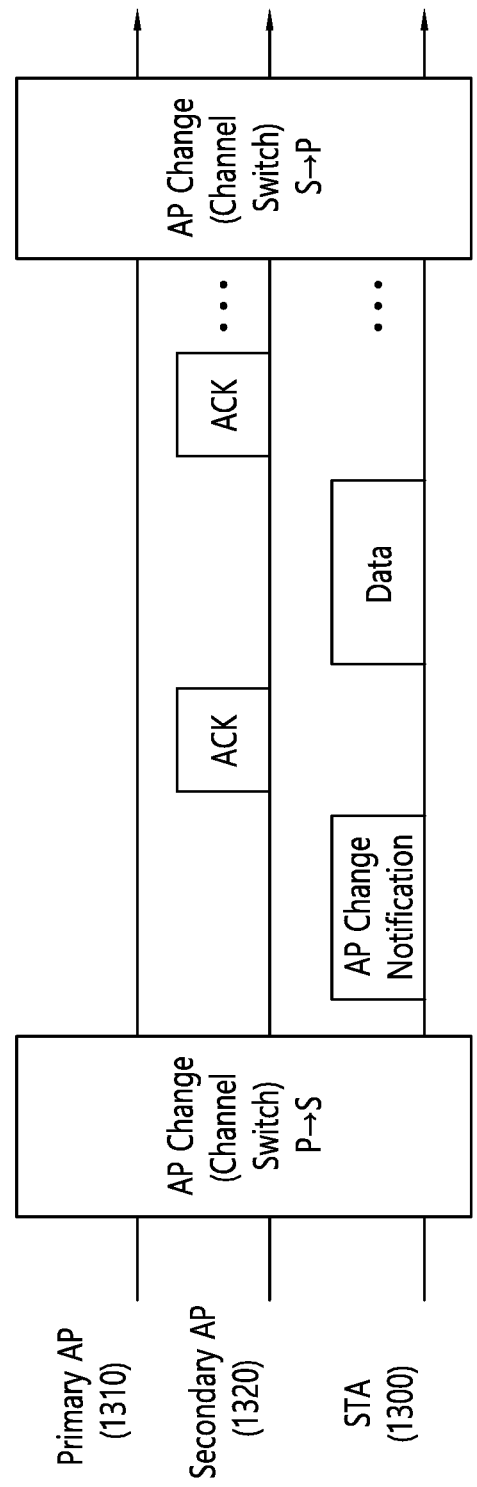
FIG. 13 illustrates still another example of an AP change procedure for supporting dual connectivity in a WLAN system according to one embodiment.

FIG. 13 illustrates still another example of an AP change procedure for supporting dual connectivity in a WLAN system according to one embodiment.

Referring to FIG. 1 to FIG. 13, a wireless terminal (STA) 1300 of FIG. 13 may correspond to the wireless terminal 1100 of FIG. 11. A primary AP 1310 of FIG. 13 may correspond to the primary AP 1110 of FIG. 11, and a secondary AP 1320 of FIG. 13 may correspond to the secondary AP 1120 of FIG. 11.

For a clear and concise description of FIG. 13, it is assumed that channels are not contiguous when an operating band for the primary AP 1310 and an operating band for the secondary AP 1320 are different or even though the primary AP 1310 and the secondary AP 1320 have the same operating band.

For example, the operating band of the primary AP 1310 may be a 2.4-GHz band, and the operating band of the secondary AP 1320 may be a 5-GHz band. In another example, the operating band of the primary AP 1310 may be a 5-GHz UNII-1 band, and the operating band of the secondary AP 1320 may be a 5-GHz UNII-3 band.

The STA 1300 may first perform an AP change procedure and may then transmit an AP change notification frame to the secondary AP 1320 in order to report that the STA will communicate with the secondary AP 1320.

After transmitting the AP change notification frame, the STA 1300 may perform a transmission/reception operation with the secondary AP 1320 and may then operate back with the primary AP 1310. The reason why the STA operates back with the primary AP 1310 is that the STA has switched to the secondary AP 1320 without notifying the primary AP 1310 of an AP change. When the state of a primary link is improved, the STA 1300 may switch to the secondary AP 1320 again after performing an AP change procedure as shown in FIG. 11 or may continue to operate with the primary AP 1310.

When the STA performs the AP change procedure without notifying the primary AP of an AP change as shown in FIG. 13, a value for a period in which the STA operates with the secondary AP may be preset. In this case, the value may be systematically set to an integer multiple of a beacon period or may be a specific value negotiated in advance between the STA and the AP in an initial association process or a dual connectivity negotiation process.

For example, the AP change notification frame of FIG. 13 may include information related to the period in which the STA operates with the secondary AP and information related to the primary AP.

Here, the information related to the period in which the STA operates with the secondary AP may be associated with the systemically set value or may be associated with the specific value negotiated between the STA and the AP in the initial association process or the dual connectivity negotiation process.

Here, the information related to the primary AP may include information related to an operating channel (i.e., a primary 20-MHz channel) of the primary AP 1310 and address information related to the primary AP 1310. When connection between the primary AP 1310 and the secondary AP 1320 is properly established, this information may be transmitted to the primary AP through the secondary AP.

For reference, according to this embodiment, downlink transmission by the APs supporting dual connectivity may be performed according to the following procedure.

For example, the primary AP may always transmit downlink data until the wireless terminal initially performs an AP change procedure to switch to the secondary AP.

For example, when the primary AP has a buffered downlink frame to be transmitted to the wireless terminal in a situation where the AP change request frame is transmitted by the wireless terminal before the AP change procedure is performed, the primary AP may operate as shown in FIG. 12.

For example, after the AP change procedure is performed, a transmission operation may not be performed until the wireless terminal switches to the secondary AP again based on information exchanged through the AP change procedure.

When the primary AP receives a frame to be transmitted to the wireless terminal from a gateway, the primary AP may transmit the frame to the secondary AP, or may continue to store the frame in a buffer thereof until the wireless terminal switches back to the primary AP.

When the wireless terminal performs an AP change procedure according to the method of FIG. 13 in an environment in which it is difficult to transmit an AP change request frame, the AP cannot receive an ACK frame of downlink data transmitted to the wireless terminal. For example, when the primary AP fails to receive an ACK frame even though retransmitting a downlink frame to a set retransmission limit, the primary AP may determine that the wireless terminal performs an AP change procedure according to the method of FIG. 13.

In this case, the primary AP may not transmit downlink data to the wireless terminal during a predetermined period. After the wireless terminal switches back to the primary AP and the primary AP receives any frame from the wireless terminal, the wireless terminal may transmit a downlink data frame.

For example, after the wireless terminal switches from the primary AP to the secondary AP through an AP change procedure, the secondary AP may transmit downlink data to the wireless terminal. When the wireless terminal switches to the secondary AP, an AP change notification frame or uplink data is received by the secondary AP, and thus the secondary AP may transmit a downlink data frame after receiving the AP change notification frame or uplink data.

For example, when the wireless terminal performing transmission on the secondary link switches to the primary AP, the secondary AP may wait for transmission of a downlink data frame until the wireless terminal switches to the secondary AP again, or may transmit the downlink frame to the primary AP.

Figure 14:
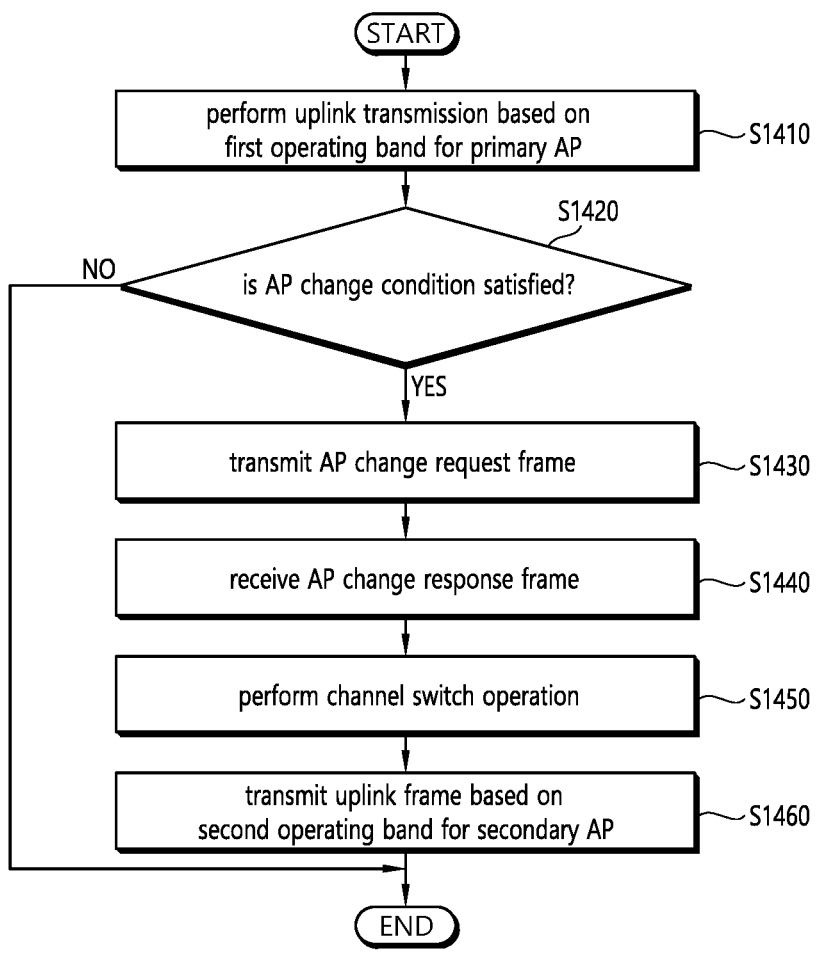
FIG. 14 is a flowchart illustrating a method for supporting dual connectivity in a WLAN system from the viewpoint of a wireless terminal according to one embodiment.

FIG. 14 is a flowchart illustrating a method for supporting dual connectivity in a WLAN system from the viewpoint of a wireless terminal according to one embodiment.

Referring to FIG. 1 to FIG. 14, a STA of FIG. 14 may be understood as a wireless terminal that is connected to a first AP and a second AP and supports dual connectivity. For a clear and concise understanding of FIG. 14, the first AP of FIG. 14 may be understood as a primary AP having a first operating band, and the second AP of FIG. 14 may be understood as a secondary AP having a second operating band.

In operation S1410, the STA of FIG. 14 may perform uplink transmission with the first AP, which is the primary AP, based on the first operating band. For example, the STA of FIG. 14 may transmit an uplink frame to the first AP based on a predetermined primary 20-MHz channel within the first operating band.

In operation S1420, the STA of FIG. 14 may determine whether a predetermined AP change condition is satisfied. A detailed description of the AP change condition may correspond to the above description with reference to FIG. 11.

When it is determined that the AP change condition is not satisfied, the process ends. When it is determined that the AP change condition is satisfied, operation S1430 is performed.

In operation S1430, the STA of FIG. 14 may transmit an AP change request frame for requesting a change of transmission band to the first AP in order to perform uplink transmission based on the second operating band.

For example, the AP change request frame may include information related to time when an operating band for the STA is changed from the first operating band to the second operating band according to a channel switch operation.

Further, the AP change request frame may include information related to a time period in which an uplink operation by the STA is allowed in the second operating band.

The AP change request frame may also include an operating channel of the second AP (e.g., a primary 20-MHz channel of the second AP) and address information related to the second AP.

In addition, the AP change request frame may include information related to existence of a downlink frame buffered in the first AP for the STA.

For example, the AP change request frame may be transmitted through a preset first primary channel within the first operating band for the first AP. Further, an AP change response frame may be received through the preset first primary channel within the first operating band for the first AP. For example, an uplink frame may be transmitted through a preset second primary channel within the second operating band.

In operation S1440, the STA of FIG. 14 may receive an AP change response frame from the first AP in response to the AP change request frame.

When receiving the AP change request frame, the STA may perform a channel switch operation in operation S1450. For example, when the channel switch operation is performed, an uplink transmission operation of the STA may be performed in the second operating band associated with the secondary AP rather than in the first operating band associated with the initial primary AP.

In operation S1460, the STA of FIG. 14 may transmit an uplink frame to the second AP based on the second operating band changed according to the channel switch operation.

In the following description, a case where an operating band for a primary AP and an operating band for a secondary AP are the same band and an operating channel (i.e., a primary 20-MHz channel) for the primary AP and an operating channel (i.e., a primary 20-MHz channel) for the secondary AP are contiguous is illustrated.

In this case, the operating band of the primary AP may be a 2.4-GHz band, and the operating band of the secondary AP may be a 2.4-GHz band. In another example, the operating band of the primary AP may be a 5-GHz UNII-1 band, and the operating band of the secondary AP may be a 5-GHz UNII-1 band. In still another example, the operating band of the primary AP may be a 5-GHz UNII-1 band, and the operating band of the secondary AP may be a 5-GHz UNII-2 band.

Figure 15:
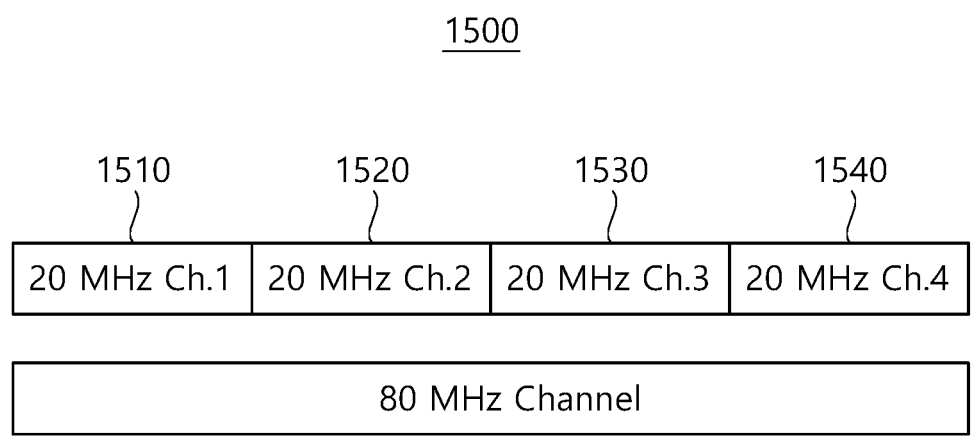
FIG. 15 illustrates channelization of a UNII-1 band according to one embodiment.

FIG. 15 illustrates channelization of a UNII-1 band according to one embodiment.

For a clear and concise understanding of FIG. 15, it may be assumed that an operating band for a primary AP of FIG. 15 is a 5-GHz UNII-1 band and an operating band for a secondary AP is a 5-GHz UNII-1 band.

Referring to FIG. 15, a UNII-1 band 1500 corresponding to an 80-MHz bandwidth may include first to fourth channels 1510 to 1540 having a 20-MHz bandwidth. For example, the first to fourth channels 1510 to 1540 of FIG. 15 may correspond to the four 20-MHz channels (i.e., the 36th channel, the 40th channel, the 44th channel, and the 48th channel) of FIG. 6.

In drawings to be described below, it may be assumed that an operating channel (i.e., a primary 20-MHz channel) for a primary AP is the first channel 1510 of FIG. 15, and an operating channel (i.e., a primary 20-MHz channel) for a secondary AP is the fourth channel 1540 of FIG. 15. However, it will be understood that the embodiment shown in FIG. 15 is only for illustration and this specification is not limited thereto.

Figure 16:
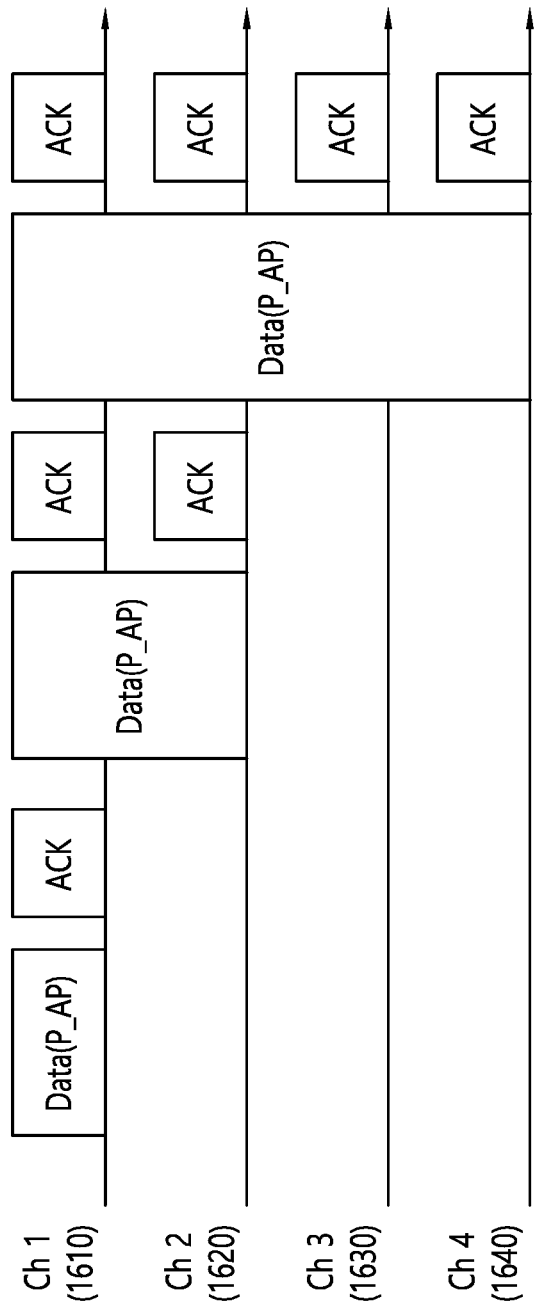
FIG. 16 illustrates the type of a frame transmitted through a primary link according to one embodiment.

FIG. 16 illustrates the type of a frame transmitted through a primary link according to one embodiment.

Referring to FIG. 15 and FIG. 16, a first channel 1610 of FIG. 16 may correspond to the first channel 1510 of FIG. 15, and a second channel 1620 of FIG. 16 an operating channel the second channel 1520 of FIG. 15. Further, a third channel 1630 of FIG. 16 may correspond to the third channel 1530 of FIG. 15, and a fourth channel 1640 of FIG. 16 may correspond to the fourth channel 1540 of FIG. 15.

According to the aforementioned assumption, an operating channel (i.e., a primary 20-MHz channel) for a primary AP (P_AP) of FIG. 16 may be the first channel 1610 of FIG. 16.

FIG. 16 shows a plurality of types of frames transmitted through a primary link between the primary AP (P_AP) and a wireless terminal (i.e., STA).

For example, the primary AP (P_AP) may transmit a downlink data frame through the first channel 1610. The primary AP (P_AP) may receive an ACK frame through the first channel 1610.

For example, the primary AP (P_AP) may transmit a downlink data frame through the first channel 1610 and the second channel 1620. The primary AP (P_AP) may receive an ACK frame through the first channel 1610 and the second channel 1620.

For example, the primary AP (P_AP) may transmit a downlink data frame through the first to fourth channels 1610 to 1640. The primary AP (P_AP) may receive an ACK frame through the first to fourth channels 1610 to 1640.

Figure 17:
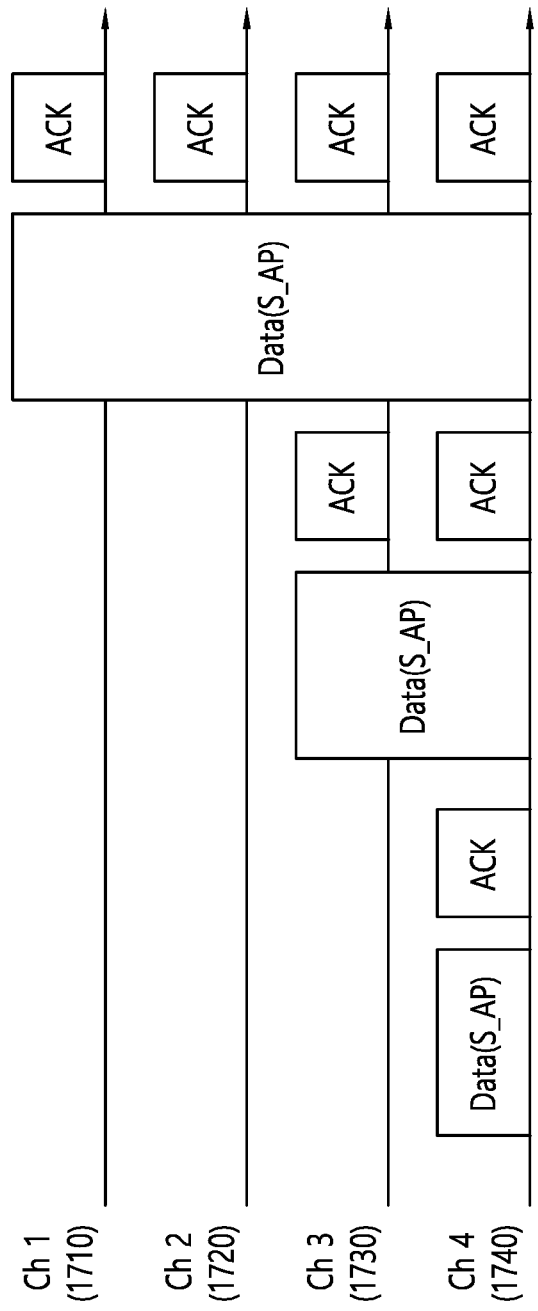
FIG. 17 illustrates the type of a frame transmitted through a secondary link according to one embodiment.

FIG. 17 illustrates the type of a frame transmitted through a secondary link according to one embodiment.

Referring to FIG. 15 and FIG. 17, a first channel 1710 of FIG. 17 may correspond to the first channel 1510 of FIG. 15, and a second channel 1720 of FIG. 17 may correspond to the second channel 1520 of FIG. 15. Further, a third channel 1730 of FIG. 17 may correspond to the third channel 1530 of FIG. 15, and a fourth channel 1740 of FIG. 17 may correspond to the fourth channel 1540 of FIG. 15.

According to the aforementioned assumption, an operating channel (i.e., a primary 20-MHz channel) for a secondary AP (S_AP) of FIG. 17 may be the fourth channel 1740 of FIG. 17.

FIG. 17 shows a plurality of types of frames transmitted through a secondary link between the secondary AP (S_AP) and a wireless terminal (i.e., STA).

For example, the secondary AP (S_AP) may transmit a downlink data frame through the fourth channel 1740. The secondary AP (S_AP) may receive an ACK frame through the fourth channel 1740.

For example, the secondary AP (S_AP) may transmit a downlink data frame through the third channel 1730 and the fourth channel 1740. The secondary AP (S_AP) may receive an ACK frame through the third channel 1730 and the fourth channel 1740.

For example, the secondary AP (S_AP) may transmit a downlink data frame through the first to fourth channels 1710 to 1740. The secondary AP (S_AP) may receive an ACK frame through the first to fourth channels 1710 to 1740.

Figure 18:
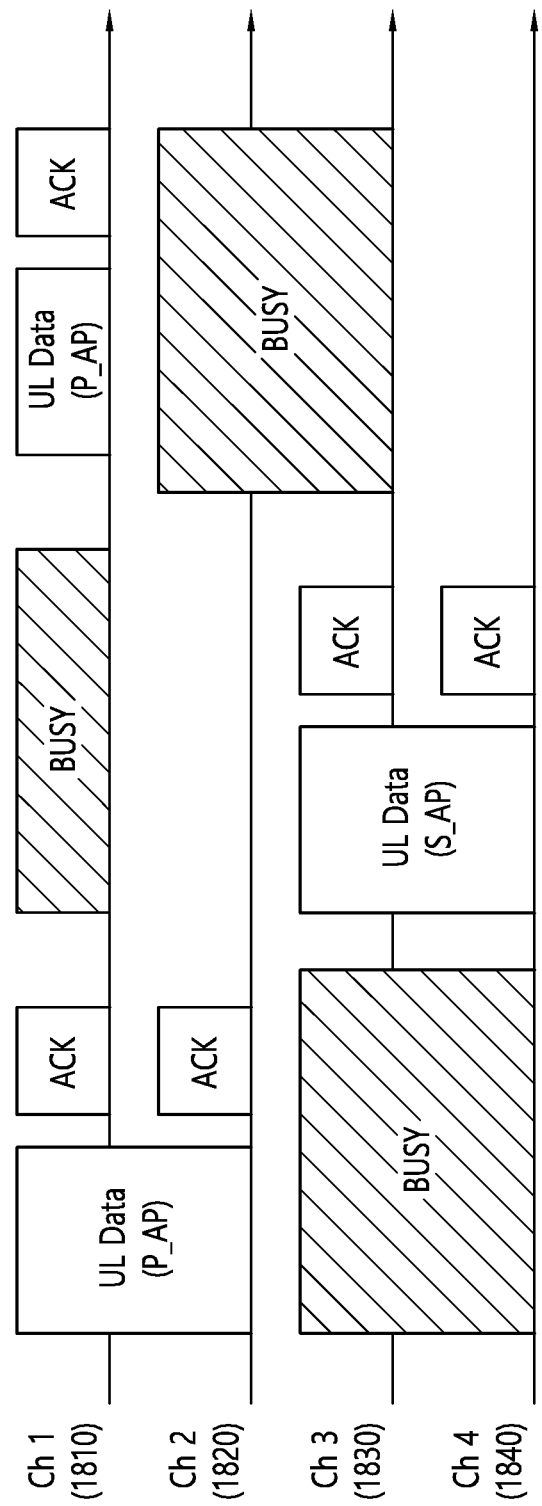
FIG. 18 illustrates a procedure for supporting dual connectivity in a WLAN system according to one embodiment.

FIG. 18 illustrates a procedure for supporting dual connectivity in a WLAN system according to one embodiment.

Referring to FIG. 16 to FIG. 18, since a primary AP and a secondary AP operate in the same channel band in this embodiment, a wireless terminal according to this embodiment does not need to perform a channel switch procedure performed between an operating channel for the primary AP and an operating channel for the secondary AP.

According to this embodiment, the wireless terminal performing general channel contention on an 80-MHz channel may perform different transmissions to the respective APs depending on whether the state of a wireless channel is busy/idle.

For example, when the wireless terminal according to this embodiment determines that the channel states of third and fourth channels 1830 and 1840 are busy, the wireless terminal may transmit an uplink data frame to the primary AP through first and second channels 1810 and 1820.

In another example, when the wireless terminal according to this embodiment determines that the first channel 1810 is busy (additionally assuming that the third and fourth channels 1830 and 1840 are determined to be idle), the wireless terminal may transmit an uplink data frame to the secondary AP through the third and fourth channels 1830 and 1840.

In still another example, when the wireless terminal according to this embodiment determines that the second and third channels 1820 and 1830 are busy, the wireless terminal may transmit an uplink frame to the primary AP and the secondary AP through the first channel 1810 and the fourth channel 1840, respectively. For reference, for the aforementioned uplink frame transmission method, the wireless terminal may simultaneously perform two CSMA-CA processes.

For reference, according to this embodiment, downlink transmission by the APs supporting dual connectivity may be performed according to the following procedure.

According to this embodiment, since the two APs use the same channel band, it may not be necessary to identify which link the wireless terminal is currently associated with. Accordingly, the two APs may directly transmit a 20-MHz, 40-MHz, or 80-MHz frame to the wireless terminal according to the current state of a wireless channel (i.e., busy or idle).

However, when the wireless terminal receives downlink frames from the respective two APs through overlapping bands, the wireless terminal may be highly likely to fail to decode the downlink frames.

To prevent failure of decoding, the wireless terminal according to this embodiment may propose a specified band for the primary AP or the secondary AP through receiver operating mode indication (ROMI) information.

For example, when the secondary AP is configured to perform downlink transmission only with 20 MHz through an ROMI, transmission bands for downlink transmission for the two APs may not overlap except when the primary AP performs transmission using 80 MHz.

In another example, a specific AP may be configured to not to perform downlink transmission during a specified period through the primary AP or secondary AP and the aforementioned AP change process.

Figure 19:
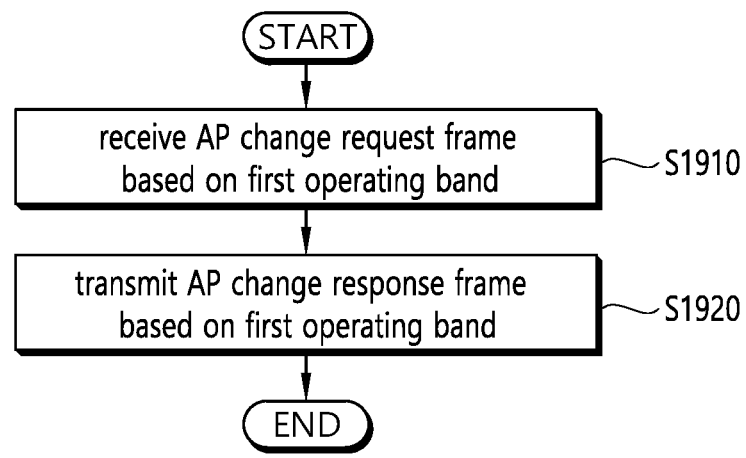
FIG. 19 is a flowchart illustrating a method for supporting dual connectivity in a WLAN system from the viewpoint of an AP according to one embodiment.

FIG. 19 is a flowchart illustrating a method for supporting dual connectivity in a WLAN system from the viewpoint of an AP according to one embodiment.

Referring to FIG. 1 to FIG. 19, a STA of FIG. 19 may be understood as a wireless terminal that is connected to a first AP and a second AP and supports dual connectivity. For a clear and concise understanding of FIG. 19, the first AP of FIG. 19 may be understood as a primary AP having a first operating band, and the second AP of FIG. 19 may be understood as a secondary AP having a second operating band.

In operation 1910, the first AP of FIG. 19 may receive an AP change request frame for requesting an AP change from the STA. For example, the AP change request frame may be understood as a frame received from the STA when the aforementioned AP change condition is satisfied.

For example, the AP change request frame may include information related to time when an operating band for the STA is changed from the first operating band to the second operating band according to a channel switch operation.

Further, the AP change request frame may include information related to a time period in which an uplink operation by the STA is allowed in the second operating band.

The AP change request frame may also include an operating channel of the second AP (e.g., a primary 20-MHz channel of the second AP) and address information related to the second AP.

In addition, the AP change request frame may include information related to existence of a downlink frame buffered in the first AP for the STA.

In operation S1920, the first AP of FIG. 19 may transmit an AP change response frame to the STA in response to the AP change request frame. The first AP transmitting the AP change response frame expects the STA to operate with the secondary AP for a specified time and may thus suspend transmitting a downlink frame buffered for the STA for the specified time.

Additionally, hereinafter, a communication operation between a wireless terminal and an AP for supporting 2-RF dual connectivity may be considered.

For example, a case where an operating band for a primary AP and an operating band for a secondary AP are different, or channels are not contiguous even though the primary AP and the secondary AP have the same operating band may be considered.

For example, the operating band of the primary AP may be a 2.4-GHz band, and the operating band of the secondary AP may be a 5-GHz band. In another example, the operating band of the primary AP may be a 5-GHz UNII-1 band, and the operating band of the secondary AP may be a 5-GHz UNII-3 band.

For transmission of an uplink frame, since RFs of the wireless terminal are adjusted to the primary AP and the secondary AP, respectively, only one RF may be used when transmitting an uplink data frame. Since information related to a corresponding configuration may be exchanged in an association process or a dual connectivity negotiation process, the wireless terminal may transmit uplink data by dividing time resources for the primary AP and the secondary AP without performing an AP change process or a channel switch procedure.

For reference, for the aforementioned uplink transmission method, the wireless terminal may simultaneously perform two CSMA-CA processes for each RF.

For transmission of a downlink frame, since the RFs of the wireless terminal are adjusted to the primary AP and the secondary AP, respectively, the two APs may transmit a downlink data frame to the terminal without time restriction.

However, since the wireless terminal cannot receive different downlink frames from the two APs at the same time, the wireless terminal may perform a reception operation based on one RF and may treat a frame received based on the other RF as lost.

In addition, a case where an operating band for a primary AP and an operating band for a secondary AP are the same and operating channels (i.e., a primary 20-MHz channel) are contiguous may be considered.

For example, the operating band of the primary AP may be a 2.4-GHz band, and the operating band of the secondary AP may be a 2.4-GHz band. In another example, the operating band of the primary AP may be a 5-GHz UNII-1 band, and the operating band of the secondary AP may be a 5-GHz UNII-1 band. In still another example, the operating band of the primary AP may be a 5-GHz UNII-1 band, and the operating band of the secondary AP may be a 5-GHz UNII-2 band.

For transmission of an uplink frame, when a wireless terminal has two RF channels and a channel for the primary AP and a channel for the secondary AP are the same or when transmission/reception is entirely possible with one RF, the following two operations may be considered.

For example, when the two APs support a broadband of 160 MHz or more in a 5-GHz band or a broadband of 4 GHz or more in a 60-GHz band, both RFs may be used for broadband transmission/reception.

For example, when the two APs do not support a broadband, one RF may be configured as an RF operating in the same channel as described above, and the other RF may be configured to discover an additional AP in a different band and to be used for a handover operation.

A description of transmission of a downlink frame may correspond to a description of a 1-RF case.

Figure 20:
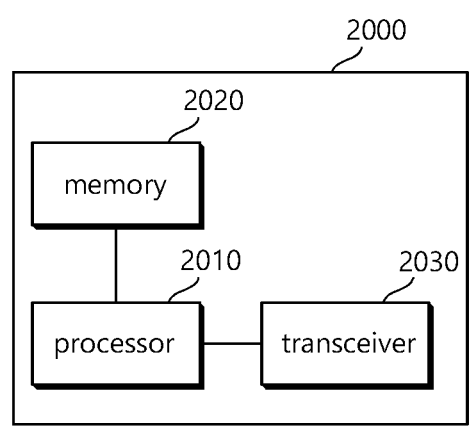
FIG. 20 is a block diagram illustrating a wireless device to which the embodiments are applicable.

FIG. 20 is a block diagram illustrating a wireless device to which the embodiments are applicable.

Referring to FIG. 20, the wireless device may be an STA capable of implementing the foregoing embodiments, which may be an AP or a non-AP STA. Further, the wireless device may correspond to the foregoing user or a transmission device that transmits a signal to the user.

As illustrated in FIG. 20, the wireless device includes a processor 2010, a memory 2020, and a transceiver 2030. The processor 2010, the memory 2020, and the transceiver 2030 may be configured as separate chips or as a single chip having at least two blocks/functions.

The transceiver 2030 may be a device including a transmitter and a receiver. When a particular operation is performed only any one of the transmitter and the receiver may operate or both the transmitter and the receiver may operate. The transceiver 2030 may include one or more antennas for transmitting and/or receiving a radio signal. Further, the transceiver 2030 may include an amplifier for amplifying a reception signal and/or a transmission signal and a bandpass filter for transmission on a particular frequency band.

The processor 2010 may implement the functions, processes, and/or methods proposed in the present specification. For example, the processor 2010 may perform operations according to the aforementioned embodiments. That is, the processor 2010 may perform operations disclosed in the embodiments of FIG. 1 to FIG. 19.

The processor 2010 may include an application-specific integrated circuit (ASIC), other chipsets, a logic circuit, a data processor, and/or a converter to convert a baseband signal and a radio signal from one to the other. The memory 2020 may include a read-only memory (ROM), a random access memory (RAM), a flash memory, a memory card, a storage medium, and/or other storage devices.

Figure 21:
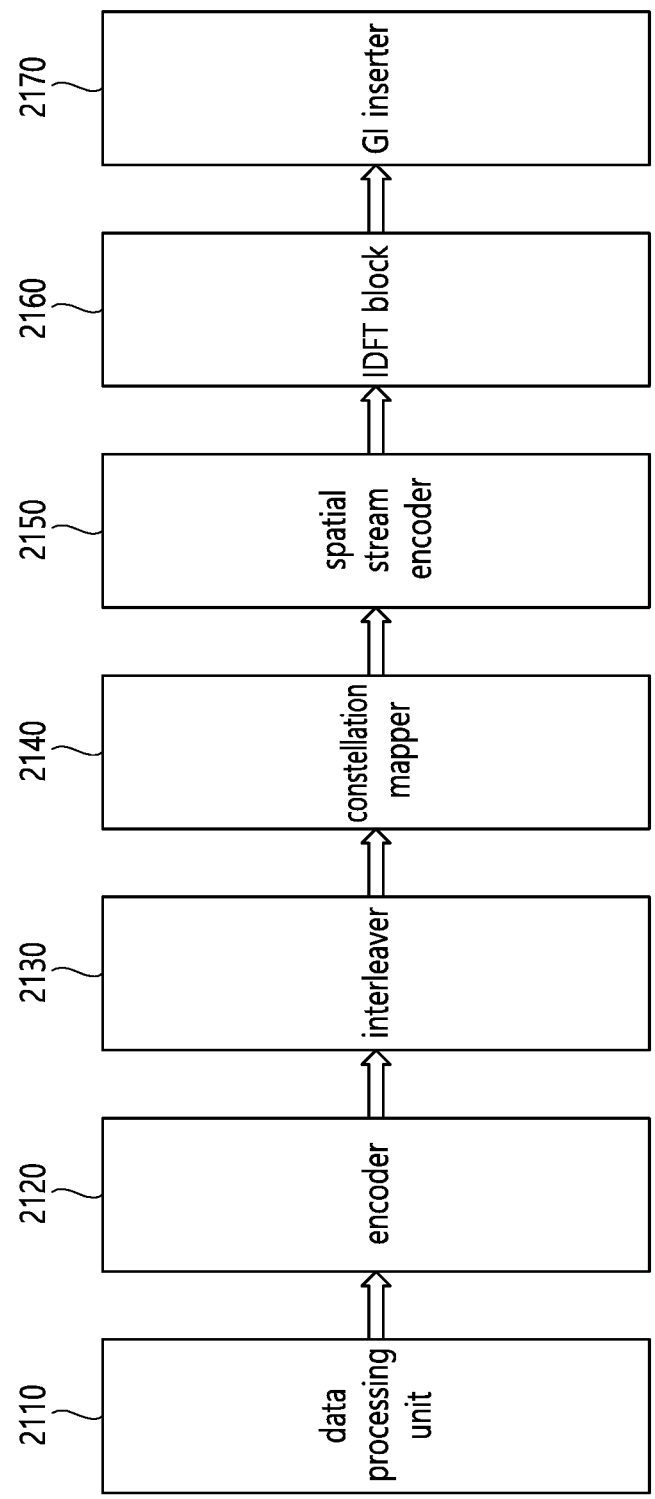
FIG. 21 is a block diagram illustrating an example of a device included in a processor.

FIG. 21 is a block diagram illustrating an example of a device included in a processor.

Although the example illustrated in FIG. 21 is described with reference to blocks for a transmission signal for convenience of description, it is obvious that the same blocks may be used to process a reception signal.

A data processing unit 2110 generates transmission data (control data and/or user data) corresponding to a transmission signal. An output from the data processing unit 2110 may be input to an encoder 2120. The encoder 2120 may perform coding using a binary convolutional code (BCC) or a low-density parity-check (LDPC) technique. At least one encoder 2120 may be included, and the number of encoders 2120 may be determined depending on various pieces of information (e.g., the number of data streams).

An output from the encoder 2120 may be input to an interleaver 2130. The interleaver 2130 performs an operation of distributing consecutive bit signals on radio resources (e.g., time and/or frequency) in order to prevent burst errors due to fading. At least one interleaver 2130 may be included, and the number of interleavers 2130 may be determined depending on various pieces information (e.g., the number of spatial streams).

An output from the interleaver 2130 may be input to a constellation mapper 2140. The constellation mapper 2140 performs constellation mapping, such as biphase shift keying (BPSK), quadrature phase shift keying (QPSK), and n-quadrature amplitude modulation (n-QAM).

An output from the constellation mapper 2140 may be input to a spatial stream encoder 2150. The spatial stream encoder 2150 may perform data processing to transmit a transmission signal through at least one spatial stream. For example, the spatial stream encoder 2150 performs at least one of space-time block coding (STBC), cyclic shift diversity (CSD) insertion, and spatial mapping on a transmission signal.

An output from the spatial stream encoder 2150 may be input to a IDFT block 2160. The IDFT block 2160 performs inverse discrete Fourier transform (IDFT) or inverse fast Fourier transform (IFFT).

An output from the IDFT block 2160 is input to a guard interval (GI) inserter 2170, and an output from the GI inserter 2170 may be input to the transceiver 2130 of FIG. 20.

Although specific embodiments have been described in detail in the present specification, various modifications are possible without departing from the scope of the present specification. Therefore, the scope of the present specification should not be construed as being limited to the aforementioned embodiments but should be defined by not only the appended claims described below but also equivalents to the claims.

What is claimed is:

1. A method by a station (STA) supporting dual connectivity in a wireless local area network system (WLAN), the method comprising:
   receiving, from a first access point (AP), a first response comprising capability information of the first AP;
   receiving, from a second AP, a second response comprising capability information of the second AP;
   determining whether an AP change condition is satisfied based on an access category (AC) of a buffered uplink (UL) frame of the STA,
   wherein an available AC of the buffered UL frame comprises one of Voice (VO), Video (VI), Best Effort (BE), or Background (BK), and
   wherein the STA determines the AP change condition is satisfied when an AC of the buffered UL frame only comprises one of the VO or the VI;
   transmitting, to the first AP via a first operating band, a first Physical Protocol Data Unit (PPDU) comprising an AP change request frame for switching from the first AP to the second AP;
   in response to the AP change request frame, receiving, from the first AP via the first operating band, a second PPDU comprising an AP change response frame,
   wherein the AP change response frame comprises information related to a buffered downlink (DL) frame addressed to the STA;

performing a channel switch operation from the first AP to the second AP; and transmitting, to the second AP via a second operating band, a third PPDU comprising the buffered UL frame.

2. The method of claim 1, wherein the AP change request frame comprises information related to time when the channel switch operation is performed.

3. The method of claim 1, wherein the AP change request frame comprises information related to a time period in which an uplink operation by the STA is allowed in the second operating band.

4. The method of claim 1, wherein the AP change request frame comprises an operating channel of the second AP and address information related to the second AP.

5. The method of claim 1, wherein the STA determines the AP change condition is not satisfied when an AC of the buffered UL frame comprises the BE or the BK.

6. The method of claim 1, wherein the buffered UL frame comprises multiplexed data units having different ACs.

7. The method of claim 1, wherein each of the first response and the second response is a Beacon or a Probe Response frame.

8. A station (STA) supporting dual connectivity in a wireless local area network system (WLAN), the STA comprising:

a transceiver to transmit or receive a radio signal; and
a processor to control the transceiver,
wherein the processor is configured to:
receive, from a first access point (AP), a first response comprising capability information of the first AP;
receive, from a second AP, a second response comprising capability information of the second AP;
determine whether an AP change condition is satisfied based on an access category (AC) of a buffered uplink (UL) frame of the STA,
wherein an available AC of the buffered UL frame comprises one of Voice (VO), Video (VI), Best Effort (BE), or Background (BK), and wherein the STA determines the AP change condition is satisfied when an AC of the buffered UL frame only comprises one of the VO or the VI;

transmit, to the first AP via a first operating band, a first Physical Protocol Data Unit (PPDU) comprising an AP change request frame for switching from the first AP to the second AP;

in response to the AP change request frame, receive, from the first AP via the first operating band, a second PPDU comprising an AP change response frame, wherein the AP change response frame comprises information related to a buffered downlink (DL) frame addressed to the STA;

perform a channel switch operation from the first AP to the second AP; and transmit, to the second AP via a second operating band, a third PPDU comprising the buffered UL frame.

9. The STA of claim 8, wherein the AP change request frame comprises information related to time the channel switch operation is performed.

10. The STA of claim 8, wherein the AP change request frame comprises information related to a time period in which an uplink operation by the STA is allowed in the second operating band.

11. The STA of claim 8, wherein the AP change request frame comprises an operating channel of the second AP and address information related to the second AP.

12. The STA of claim 8, wherein the processor determines the AP change condition is not satisfied when an AC of the buffered UL frame comprises the BE or the BK.

13. The STA of claim 8, wherein the buffered UL frame comprises multiplexed traffic data units having different ACs.

14. The STA of claim 8, wherein each of the first response and the second response is a Beacon or a Probe Response frame.

* * * * *